United States Patent [19]

Best

[11] 4,278,837
[45] Jul. 14, 1981

[54] CRYPTO MICROPROCESSOR FOR EXECUTING ENCIPHERED PROGRAMS

[76] Inventor: Robert M. Best, 16016 9th Ave. NE., Seattle, Wash. 98155

[21] Appl. No.: 44,952

[22] Filed: Jun. 4, 1979

Related U.S. Application Data

[63] Continuation-in-part of Ser. No. 846,638, Oct. 31, 1977, Pat. No. 4,168,396, and Ser. No. 927,580, Jul. 24, 1978, abandoned, which is a continuation of Ser. No. 750,009, Dec. 13, 1976, abandoned.

[51] Int. Cl.³ .............................................. H04L 9/00
[52] U.S. Cl. .............................. 178/22.09; 200/61.08; 364/200; 364/900
[58] Field of Search ................... 178/22; 364/200, 900; 200/61.08

[56] References Cited

U.S. PATENT DOCUMENTS

| | | | |
|---|---|---|---|
| 3,504,132 | 3/1970 | Wallace, Jr. ............... | 174/52 PE |
| 3,764,742 | 10/1973 | Abbott et al. .............. | 178/22 |
| 3,798,359 | 3/1974 | Feistel ....................... | 340/348 |
| 3,878,331 | 4/1975 | Morgan et al. ............. | 178/22 |
| 3,906,460 | 9/1975 | Halpern ..................... | 178/22 |
| 3,911,216 | 10/1975 | Bartek et al. .............. | 178/22 |
| 3,944,976 | 3/1976 | France ....................... | 340/149 A |
| 3,958,081 | 5/1976 | Ehrsam et al. ............. | 178/22 |
| 4,004,089 | 1/1977 | Richard et al. ............. | 178/22 |
| 4,037,215 | 7/1977 | Birney et al. .............. | 364/200 |
| 4,074,066 | 2/1978 | Ehrsam et al. ............. | 178/22 |
| 4,120,030 | 10/1978 | Johnstone .................. | 178/22 |

FOREIGN PATENT DOCUMENTS

2822522 12/1978 Fed. Rep. of Germany .
1393920 5/1975 United Kingdom .
1539356 1/1979 United Kingdom .

OTHER PUBLICATIONS

Von Frank J. Furrer, *Elektroniker*, (German), vol. 16, No. 3, 1977, p. ELI-7.
Motorola Des 3100 NSM Network Security Module Preview (brochure), 16 Feb. 1979, 178-22.
Hard Node (brochure), Complan, Computation Planning, Inc. 28 Mar. 1977, 178-22.

*Primary Examiner*—S. C. Buczinski
*Attorney, Agent, or Firm*—Seed, Berry, Vernon & Baynham

[57] ABSTRACT

A microprocessor for executing computer programs which are stored in cipher to prevent software piracy. Such a crypto-microprocessor deciphers the enciphered program piecemeal as it executes it, so that a large enciphered program can be securely executed without disclosing the deciphered program or associated data to persons who have access to the wiring of the computer in which the crypto-microprocessor is a component. Such a device may process valuable proprietary programs and data files which are distributed in cipher on videodiscs, semiconductor memory, or other media without risk of software piracy. Various methods of encryption may be used including methods which result in the cipher of a byte being a complicated function of the byte's address in memory. Each crypto-microprocessor chip may use a unique cipher key or tables for deciphering the program, so that a program that can be executed in one chip cannot be run in any other microprocessor.

47 Claims, 24 Drawing Figures

CRYPTO MICROPROCESSOR FOR EXECUTING ENCIPHERED PROGRAMS

CROSS REFERENCE TO RELATED APPLICATIONS

This application is a continuation-in-part of the following copending parent applications of Robert M. Best:

CIPHER DEVICE FOR PROTECTION OF COMPUTER SOFTWARE, Ser. No. 927,580 filed July 24, 1978 and now abandoned, which is a continuation of Ser. No. 750,009 filed Dec. 13, 1976 and now abandoned;

MICROPROCESSOR FOR EXECUTING ENCIPHERED PROGRAMS, Ser. No. 846,638 filed Oct. 31, 1977, now U.S. Pat. No. 4,168,396.

BACKGROUND OF THE INVENTION

1. Field of the Invention

This invention relates to cryptographic devices, integrated circuits, microprocessors, and computer program security.

2. Description of the Prior Art

Development of computer programs for microcomputers and the data files which they process is often expensive and time-consuming. If such development is undertaken with the object of selling or leasing the programs and data, it is important to the developers that their investment not be subjected to excessive risk. The computer software industry is exposed to risk from piracy of program products by predatory competitors who can incorporate the pirated program into competing products at a fraction of the original developer's cost. Without adequate means of protection against such piracy, the risk may often be considered excessive by vendors and their financial supporters. Sustained growth of the commercial software industry may therefore depend on preventing program piracy.

In the past various means have been used to afford some degree of protection to proprietary programs and data, including contractual agreements between vendors and users, and restricted access to computers and storage media. Program products valuable enough to warrant such protection have generally been used in a relatively small number of fixed-location computer installations operated by individuals considered to be reliable by the software vendor.

However, with the advent of compact lightweight devices such as microcomputers, conventional methods of program protection have proven inadequate. Microcomputers using such programs may be analyzed in secret by their owners who may be numerous and anonymous. By the time the proprietor of the pirated program discovers the theft, the program may have been so widely distributed by the pirate that it no longer can be considered a trade secret. Also the pirate may have removed copyright marks and other indicia of ownership, thus making detection and proof of piracy difficult. The program is also unprotected from "reverse engineering" which involves disassembly of the program to produce a source code listing of the program. This source code can be included in the pirate's products.

One prior-art method of protecting a computer program is to imbed a "magnetic watermark" in a tape on which the program is recorded and distributed. This watermark, which is described in U.S. Pat. No. 4,038,596, is an unerasable key for which the system searches to auuthenticate the tape. Authorized computers will not accept data from an unmarked tape. This watermark method does not prevent the program from being used in competing computers which do not require a watermark or use a competing watermark.

Encryption has been used for protecting programs as described by Richard L. Enison in a Computation Planning Inc. technical note dated 7-28-77. In this system programs are stored in a conventional host computer in encrypted form. Attached to the host computer is a "Hard Node" computer which deciphers a selected program and outputs the program in deciphered form into the host computer's main storage. The host CPU then executes the deciphered program from its own main storage. Such a system protects the deciphered program from access by other programs, but does not protect the deciphered program from people who have access to the wiring of main storage. The present invention avoids any need for storing a deciphered program in main storage.

Another approach to software protection is described in U.S. Pat. No. 4,120,030 by Johnstone. In this system a conventional microprocessor is used, the program instructions are stored in conventional sequence and the instruction operation codes are not enciphered. The data memory units transform data addresses so that effectively a byte transposition of the data bytes results. But the data address unscrambling function can be discovered by storing test data into selected locations in data memory, then searching scrambled addresses sequentially until the test data is located.

Microcomputers generally contain one or more integrated circuit microprocessors that are usually interchangeable stock components which are available from many vendors. This interchangeability makes it easy for a pirate to plagiarize proprietary programs by using similar but unauthorized microprocessors. One method of preventing such piracy is to alter each microprocessor and the programs which accompany it so that neither the microprocessors nor the programs are interchangeable. This is accomplished in the present invention by enciphering each program in a different cipher so that each program can be deciphered and executed only by the authorized microprocessor that accompanies it in the microcomputer.

Various systems have been developed in the prior art for enciphering digital information to improve the security and privacy of data within data processing systems, during transmission over telecommunications networks, and during storage on media such as magnetic tape and disc. Examples of such cipher systems may be found in U.S. Pat. Nos. 3,798,359 and 3,958,081.

In a typical cipher system the bits of the information to be enciphered are rearranged or replaced by substitute bits under control of a secrete multi-bit number or cipher key. This substitution is reversed to decipher the enciphered information. Very secure ciphers have been developed by combining enciphering methods such as transposing the bits prior to substitution, by substituting bits in groups (for example substituting "0110" for "0001"), by combining bits using exclusive -OR (modulo-2 addition without carry), and by alternating such transposition, substitution and addition several times during the enciphering and deciphering process. Such cipher systems are practically unbreakable without testing all possible keys, and the key can be made large enough to make such testing prohibitively time consuming.

Such prior-art cipher systems share one common weakness: once enciphered information is deciphered, it is no longer protected. No cipher system, no matter how unbreakable, protects information after it has been deciphered. Such deciphering is generally done only by persons who are authorized to receive the deciphered information, because deciphering in the prior art implies disclosure.

However, a computer program has a peculiar characteristic which makes it different from the messages and data which prior-art encryption systems were designed to protect, i.e. a program need never be read by its user. A person who owns and uses a copy of it need never have access to it. Only the processor circuits which execute the program need access it. This peculiarity of computer programs provides a bias for the present invention which makes it possible to distribute and execute copies of a program, while keeping the program secret at the same time.

OBJECTS OF THE INVENTION

Some of the objects of this invention are:

to protect a program from discovery by a person who has access to the wiring of the computer in which a copy of the program is executed;

to permit secure execution of an enciphered program which is many times larger than will fit on a microprocessor chip;

to minimize delays in program execution introduced by deciphering instructions, preferably by avoiding such delays entirely.

SUMMARY OF THE INVENTION

A cryptographic microprocessor that executes an enciphered program by deciphering instructions piecemeal as it fetches and executes them. In some embodiments a block or byte of the program is deciphered under control of a cipher key which may be modified by the block's address. Several other embodiments are claimed which use different deciphering methods.

DETAILED DESCRIPTION OF THE INVENTION

Figure 15:
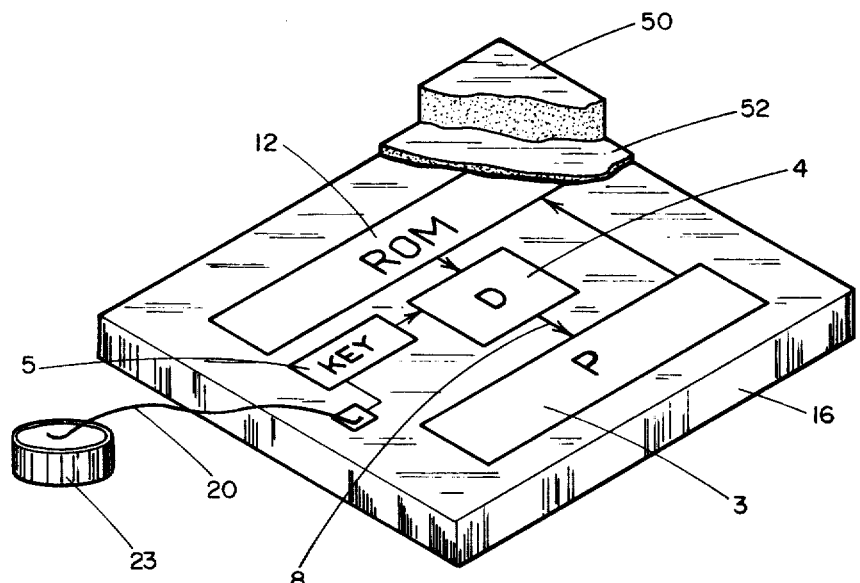
FIG. 15 is a isometric view of a CMP chip shown schematically with battery, glassification, and potting.
Figure 17:
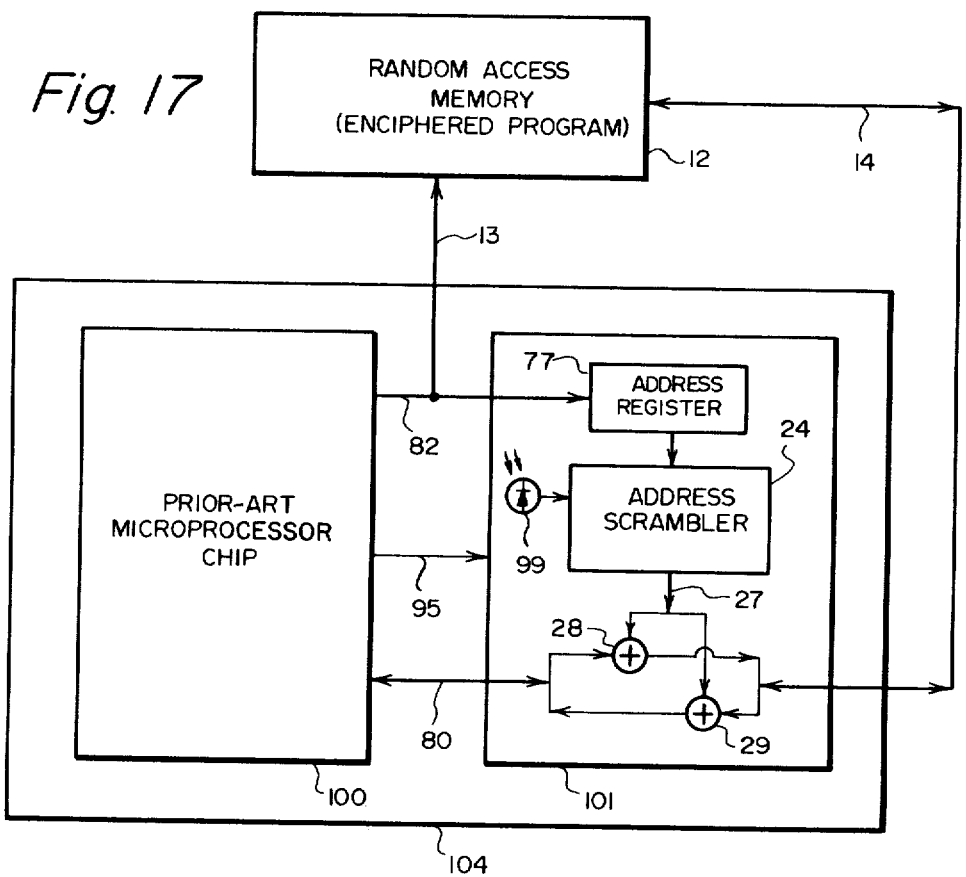
FIG. 17 is a block diagram of a CMP constructed as a hybrid circuit of a conventional microprocessor chip connected to a novel encryption chip.
Figure 18:
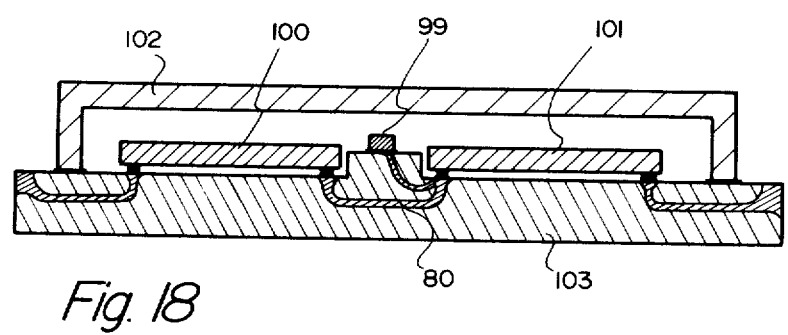
FIG. 18 is a section view of a hybrid circuit such as in FIG. 17 illustrating a CMP embodiment using flip chips and photo sensor.

A crypto-microprocessor (CMP) executes an enciphered program by piecemeal deciphering of enciphered instructions as it needs them. By deciphering small portions of the program only when they are needed, the present invention avoids any need for storing the program in deciphered form. A typical CMP is schematically shown as box 16 in FIG. 3. CMP 16 executes the enciphered program in memory 12 by addressing program portions via address bus 13, deciphering a program portion in deciphering circuit 4, and executing in processing circuit 3 the deciphered instructions obtained from circuit 4. CMP 16 may be constructed as an integrated circuit chip as shown in FIG. 15 or as a hybrid circuit as shown in FIGS. 17-18. Several alternative embodiments of CMP 16 are shown in the several drawings.

Figure 3:
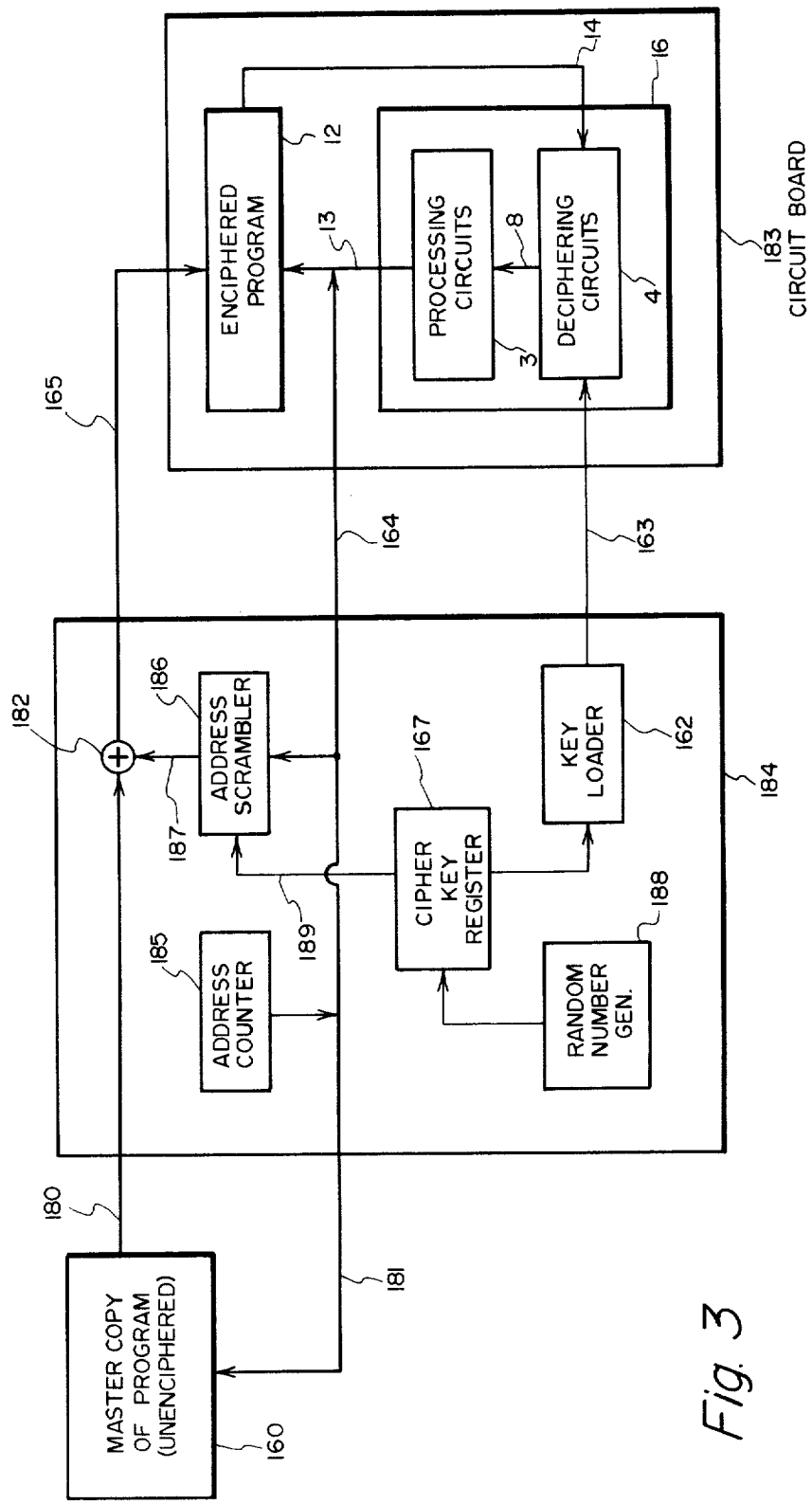
FIG. 3 is a block diagram of a CMP on a circuit board module connected to an enciphering unit which loads key and enciphered program information into the module.

Referring to FIG. 3, before CMP 16 is distributed to users on circuit board 183, enciphering unit 184 loads an enciphered program into memory 12 which is mounted on circuit board 183 along with CMP 16. The enciphering process of unit 184 is performed under the control of a secret cipher key, substitution table, or transposition matrix. These are broadly termed "key" herein except where noted. The key is loaded into CMP 16 via line 163 by unit 184 whose operation is described below.

Figure 5:
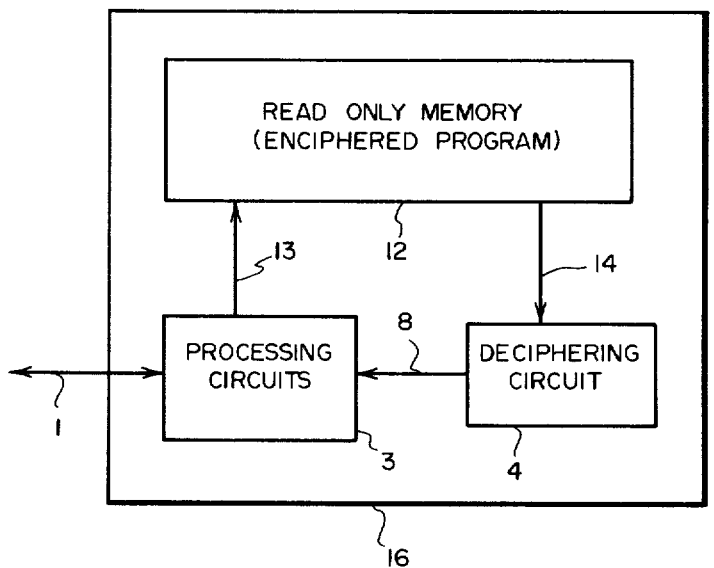
FIG. 5 is a block diagram of a CMP with on-chip read-only memory (ROM) using byte substitution.
Figure 21:
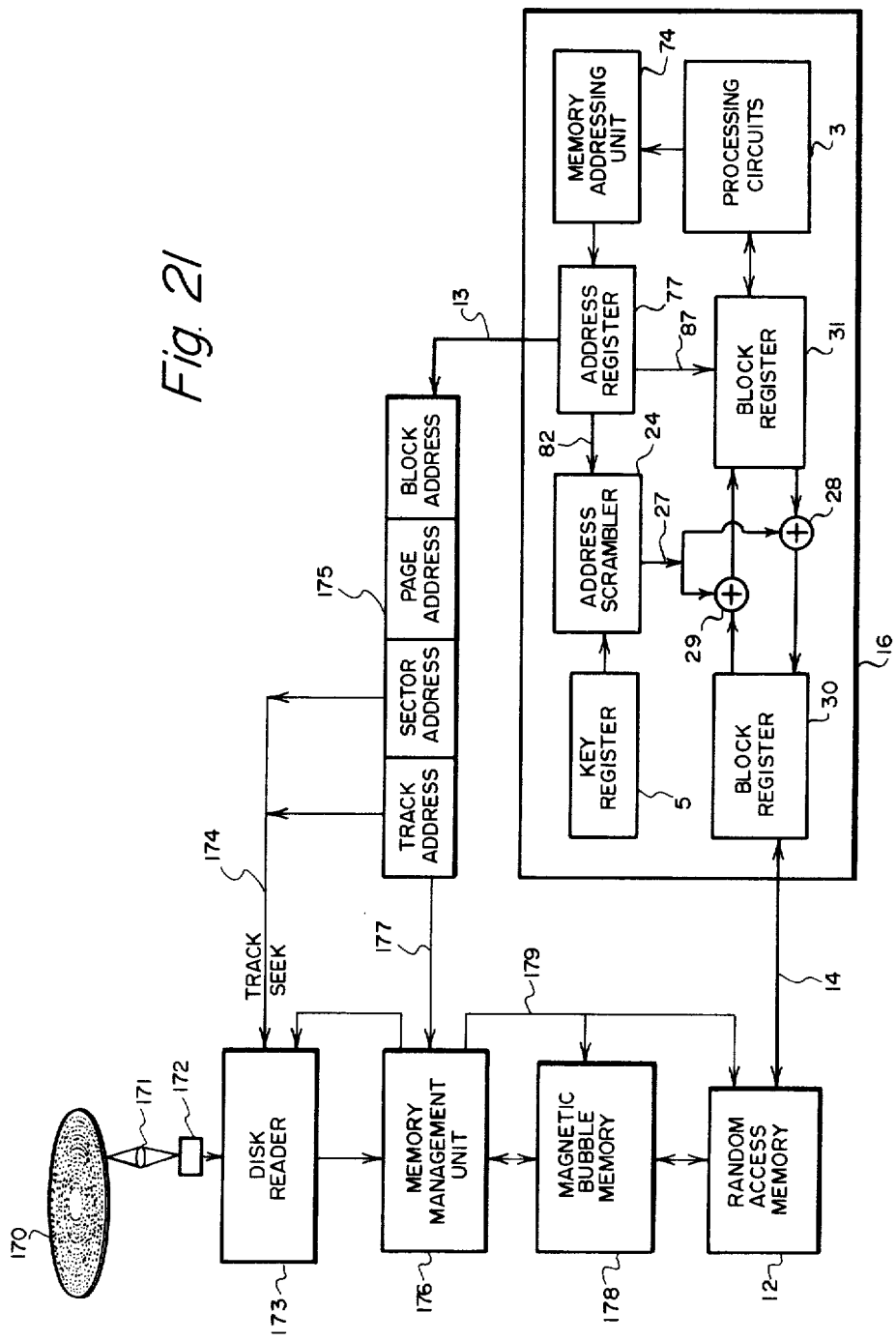
FIG. 21 is a block diagram of a CMP connected to a videodisc reader and magnetic bubble memory.

After the key and enciphered program have been loaded, lines 163-165 are disconnected by unplugging circuit board 183 which is then distributed to users. The enciphered program in memory 12 is gibberish to anyone who does not have access to the secret key or tables in CMP 16. Mounting memory 12 and CMP 16 on a common circuit board 183 before key and program loading, prevents a program enciphered with one key from being mismatched with a CMP having a different key. Alternatively, memory 12 may be part of CMP 16 as illustrated in FIG. 5 or distributed on a separate storage medium such as a videodisc as illustrated in FIG. 21.

Figure 6:
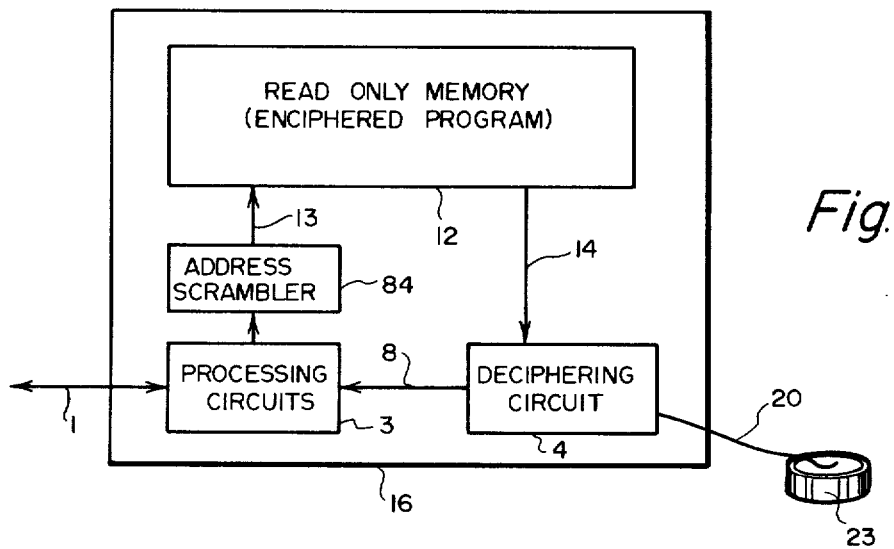
FIG. 6 is a block diagram of a CMP with one-chip ROM using both byte substitution and byte transposition.

Deciphering circuit 4 (shown as boxes in FIGS. 2–7, 15, 19, and 20), is shown in greater detail in FIGS. 1, 8–13, 17, 21, and 23, and is comprised of various elements depending on the cipher method used. Various enciphering and deciphering methods may be used, both singly and in various combinations in CMP 16 and unit 184. Deciphering in CMP 16 may be controlled by a cipher key stored in a key register (register 5 in FIG. 4), or by one or more tables (boxes 32 in FIG. 11), or by one or more matrices (boxes 92 and 93 in FIG. 10) or by an arrangement of crossed wires (wires 34 in FIG. 11). Encryption methods may include substitution (monoalphabetic, polyalphabetic and/or block), transposition (bit or byte), exclusive-OR (modulo-two) addition, or other methods. The deciphering process may be a function of program addresses (as in FIG. 1) or may be independent of program addresses (as in FIG. 4). Deciphering may be used during instruction fetch (as in FIG. 5) and may be used with byte transposition (as in FIG. 6). Product block ciphers may be used for address scrambling (box 24 in FIGS. 1 and 8) or for deciphering blocks of program (box 4 in FIGS. 2 and 4). Substitution tables (S-boxes) used for deciphering may contain secret permutations of integers (in S-boxes 32 and 35 in FIGS. 11 and 23) or fixed, publicly known functions which are selected by a secret cipher key (such as described in U.S. Pat. No. 3,958,081).

Figures 8, 9:
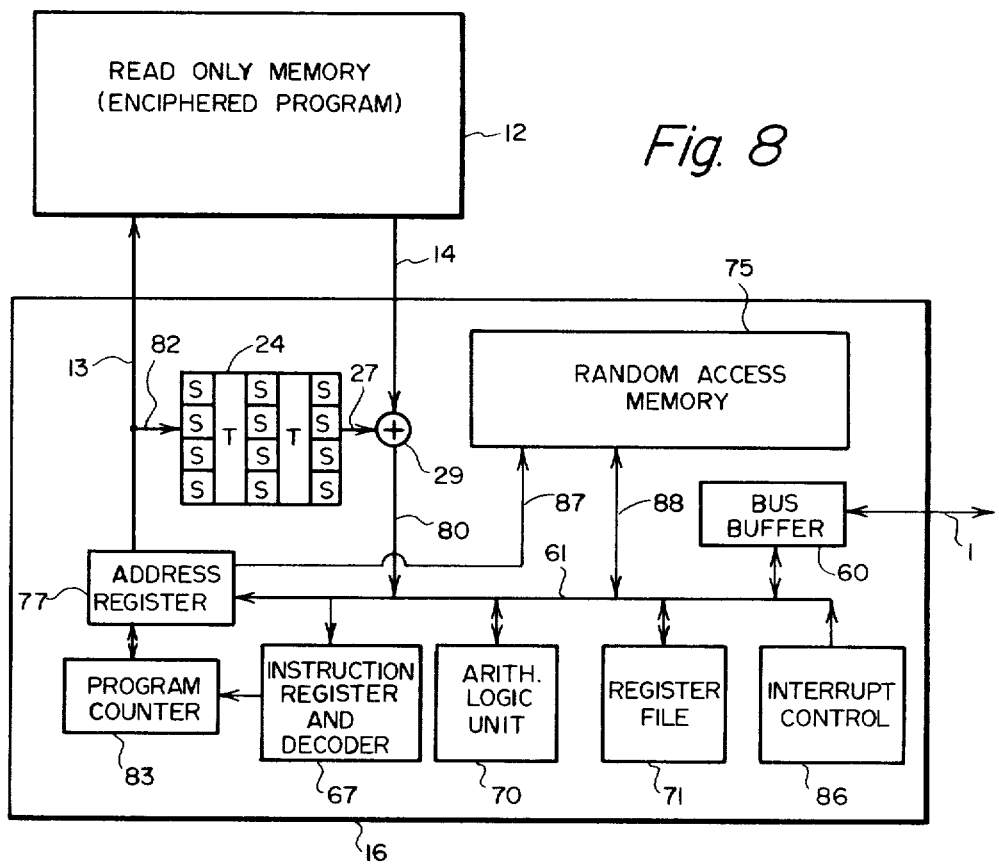
FIG. 8 is a block diagram of a CMP with external ROM and a five-stage address scrambler.
FIG. 9 is a block diagram of a CMP with on-chip ROM and an address scrambler using bit transposition.

Processing circuit 3 includes conventional microprocessor elements which are shown in greater detail in FIGS. 1, 2, 8, and 9. Typical elements include instruction decoder 67 (FIG. 1), arithmetic-logic unit (ALU) 70, register files 71 and 73, and program counter 83 (FIG. 8). An instruction register 67 (FIG. 8) or instruction queue 65 (FIG. 1) stores the instruction being executed. Queue 65 may store additional instructions which are deciphered in advance of their being needed for execution.

Unlike conventional encryption devices used in secure data communication systems which output deciphered information to authorized persons, deciphering circuit 4 produces deciphered information which is intended for use only in processing circuit 3 within CMP 16. Although small portions of the deciphered program such as error messages and control characters may be output by CMP 16, executable instructions should be concealed by CMP 16. Internal buses such as bus 64 (FIG. 1) which convey deciphered instructions during the fetch cycle should be isolated from external access (e.g. by buffer 60) during this fetch cycle.

EMBODIMENTS USING BLOCK CIPHERS

A program may be enciphered in multi-byte blocks using product block cipher methods. Each block may consist of 64 bits, 32 bits or other convenient sizes. In such cipher systems each bit of the enciphered block affects all bits of the deciphered block. Hence a pirate is prevented from tricking the microprocessor into executing slightly altered instructions, because changing any one bit of ciphertext produces a deciphered block of gibberish. By including a disabling instruction in the microprocessor's instruction set which erases the cipher key or other essential information when executed, a pirate is automatically defeated by attempts to alter instructions. The gibberish produced by such alteration will frequently include randomly located disabling instructions which when executed cause the CMP to be incapable of further deciphering. Validity of each deciphered block may also be automatically tested by using parity check bits.

Figure 4:
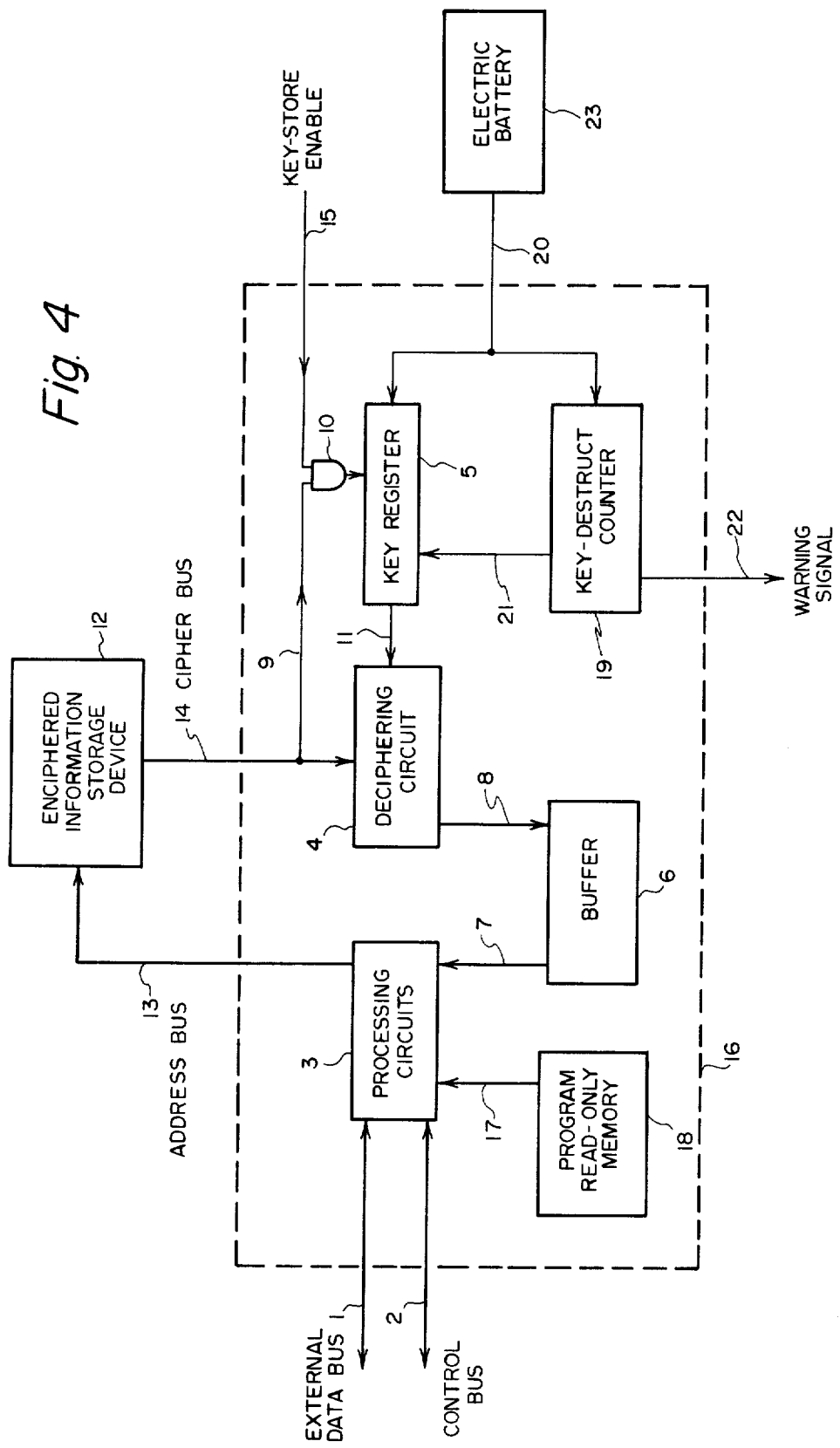
FIG. 4 is a block diagram of a CMP which uses the block cipher method and includes a circuit for erasing the cipher key.

Referring to FIG. 4, a block diagram is shown for an embodiment of the invention which deciphers the program in blocks or multiple-block pages which are temporarily stored in buffer 6 awaiting execution.

When processor 3 begins execution it fetches its first several instructions from a bootstrap program stored in read-only memory 18. Thereafter, processor 3 obtains its instructions from a program stored in memory 12 in enciphered form. This program, which may be accompanied by enciphered data also stored in memory 12, is read into CMP 16 by addressing portions of information via address bus 13 thereby causing memory 12 to output each addressed portion onto bus 14. Memory 12 may be any of a variety of conventional storage devices, such as solid-state random-access memory (RAM) or read-only memory (ROM), or buffer memories into which the enciphered program has been read from storage media such as magnetic disc or tape, optically-coded discs, or magnetic bubble domain memory.

Information on data-bus 1 includes input data to be processed and output data, but does not include the program instructions executed by processor 3. Bus 14 may be combined with data-bus 1 in practice, but are shown separately in FIG. 4 for clarity.

An alternative method of selecting portions of enciphered information from memory 12 uses unenciphered codes in the data being presented to CMP 16 on bus 14. If this data repeats at periodic intervals, as it might if it is stored on a rotating disc or is being received from a digital radio broadcast, circuit 3 need not necessarily address the data via bus 13, but rather may wait for it to appear on bus 14 identified by an unenciphered header code.

As each portion of enciphered information is input on bus 14 to deciphering circuit 4, a block register in circuit 4 is filled with successive blocks of 64 bits. Each such 64-bit block is transformed into a deciphered 64-bit block by circuit 4 under control of a specific cipher key stored in register 5. Each successive block of enciphered information is likewise deciphered by circuit 4 using the same cipher key. The key should be at least 56 bits to prevent testing of all possible keys by a pirate who has obtained samples of the deciphered information (i.e. known plaintext).

Various cipher system known to the art are suitable for circuit 4. An example of such a system is described in U.S. Pat. No. 3,958,081. Where economy and speed are more important than strict security, other encryption systems may be used. Several such alternative encryption systems are disclosed herein.

When deciphering circuit 4 transforms a block of enciphered information, the resulting block of deciphered information is stored via line 8 into buffer 6 from which processor 3 fetches its instructions and deciphered operands via line 7. Lines 7 and 8 have been distinguished in FIG. 4 for clarity, but in practice may be combined as an internal data bus. However, the deciphered instructions on this internal bus should not be accessible on external bus 1 nor on any other part of CMP 16.

The cipher key may be stored into register 5 prior to distribution of CMP 16 to users. After the key has been stored in register 5 the key is not accessible on any external conductor of CMP 16, nor is it discoverable through any combination of signals to or from CMP 16. Register 5 may consist of CMOS devices which are kept electrically functioning by a maintenance current on line 20 from battery 23. If register 5 is a volatile register the maintenance current on line 20 must be continuously supplied in order to preserve the cipher key. If CMP 16 is potted in an insoluable resin, this construction makes it extremely difficult for a pirate to remove the potting material from around CMP 16 without interrupting the maintenance current on line 20 and thereby destroying the key. Once the key is destroyed, the enciphered program is secure, even though the deciphering circuitry is eventually accessed by the pirate. Battery 23 may be packaged in the same assembly with CMP 16 (e.g. on circuit board 183 in FIG. 3) so that the key in register 5 will remain intact during shipping and handling.

In some situations it is desirable to limit the amount of time or the number of times that the enciphered program can be used. To prevent a thief from gaining unlimited use of the computer and programs, key-destruct counter 19 may be included in CMP 16, to act as a timer which records the total duration of use of CMP 16, or to count the number of times CMP 16 is used. Counter 19 may be a binary counter of about 44 bits which is incremented by pulses from a conventional clock (not shown), which also controls timing in the logic circuitry of CMP 16. When counter 19 overflows or reaches some predetermined value, the contents of key-register 5 may be erased via line 21 thereby disabling CMP 16. Authorized users may receive fresh modules periodically containing an intact key, but a thief would be unable to use the computer and programs after the time limit or usage count elapsed.

An enciphering circuit 142 (FIG. 19) or a microprogram to encipher data output too random-access memory 151 may also be included in CMP 16 or 140. This permits temporary external storage of portions of partially processed data without compromising its contents. The same cipher system used in circuit 4 may be used for re-enciphering, and the key in register 5 may be used both for enciphering and deciphering data in memory 12. However this may reduce the security of the key if a simple cipher system is used for the data in memory 12. It may therefore be preferable to use a different cipher system or a different key 89 (FIG. 2) for enciphering temporarily stored data. Quasi-random keys may be generated from the low-order bits of counter 19 (FIG. 4).

Although product block ciphering methods may be used for enciphering programs and randomly-accessed data, and are secure against known-plaintext and chosen-ciphertext attack, block ciphers have certain weaknesses when used with random access. The pirate should be prevented from accessing plaintext by relocating blocks of enciphered data to locations from which the program generates plaintext output such as error messages. The pirate should also be prevented from tricking the device into executing instructions in the wrong sequence or bypassing blocks of instructions by rearranging blocks of the enciphered program in memory 12.

Figure 2:
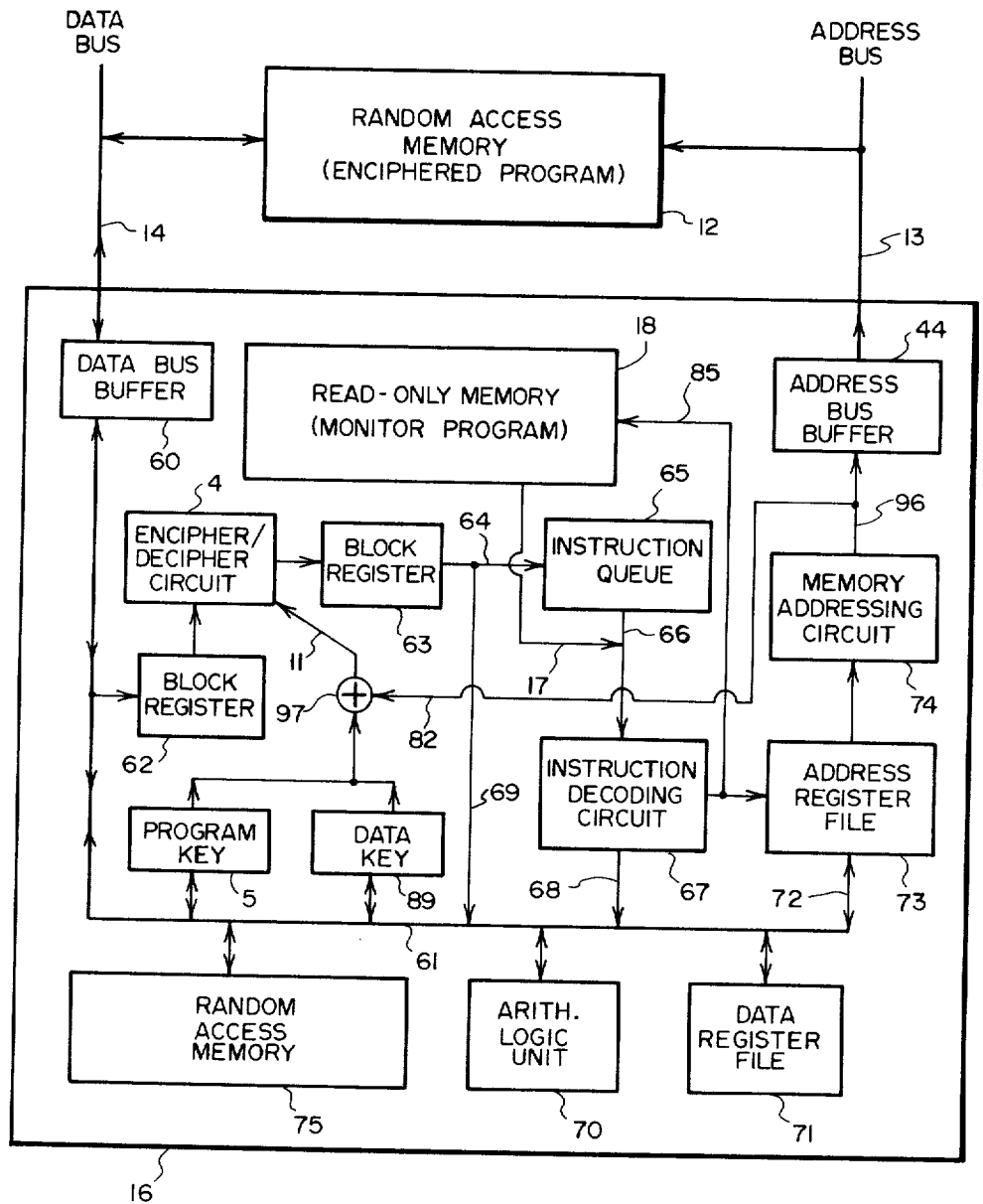
FIG. 2 is a block diagram of a CMP which uses the block cipher method of encryption with address-dependent keys.

Cryptanalysis by block relocation can be prevented by altering the cipher key for each block address, so that each block is enciphered with a different key. The block address may be exclusive-ORed with the basic key in register 5 to produce an altered key for deciphering circuit 4. This is illustrated in FIG. 2. Each block in the address space of CMP 16 may have a unique logical address and hence a unique key. Physical storage of these blocks need not conform to logical address sequence. Prior-art memory management and virtual-storage techniques may be used which result in multi-block pages being stored in unpredictable physical locations. This relocation need not affect dependency of the cipher on logical addresses which have an unambiguous means and refer to specific portions of program or data.

It may be desirable to apply patches to the enciphered program to correct errors and implement enhancements, provided this does not introduce a weakness in the security of the system. One or more blocks of enciphered patch information may be addressed dynamically in lieu of the blocks in memory 12. This can be done securely if the key is altered for each block address as shown in FIG. 2.

Referring to FIG. 2, an embodiment is shown which uses a block cipher method in deciphering circuit 4 under control of a variable key in register 5 or 89. The block size may be any convenient size such as 32 bits or 64 bits. A block may contain several instructions which are deciphered as a block and are stored in first-in/first-out queue register 65 along with any instructions from the previous block that have not yet been executed by conventional instruction decoder 67. As instructions in queue 65 are executed by decoder 67 and sufficient space in queue 65 becomes available, the next block of instructions is addressed by conventional addressing circuit 74 via address bus 13. The addressed block is read from memory 12 onto data bus 14 and thence via bus buffer 60 to block register 62. Deciphering unit 4 then deciphers the enciphered block in register 62 under the control of the scrambled key on bus 11 which is based on the cipher key in register 5 modified by the address on bus 82. The deciphered block of instructions, which deciphering unit 4 stores into register 63, passes to queue 65 via bus 64.

Whenever a jump instruction addresses a next instruction which is not in queue 65 the contents of queue 65 ae erased and the block containing the next instruction is addressed by unit 74.

An interrupt caused by an asynchronous event may require a jump to an interrupt routine stored in read-only memory (ROM) 18. The instructions in this interrupt routine are fetched via bus 17 and preempt any instructions waiting in queue 65. Read-only memory 18 may also contain a bootstrap program for execution when power is first turned on, and routines for handing the cipher keys which are stored in registers 5 and 89. Generally, the routines in ROM 18 may include security kernel functions which should not be entrusted to externally stored enciphered programs. Key registers should not be accessible to instructions other than those fetched from a security kernel program in ROM 18.

The data processed by microprocessor 16 in FIG. 2 may be enciphered and deciphered by circuit 4 under control of the key in register 5 or 89 altered at gates 97 by address bits on bus 82. Enciphered data in RAM 12 may be addressed in blocks by unit 74, and read via data bus 14 into block register 62 for deciphering by circuit 4. The deciphered block in block register 63 passes via buses 69 and 61 to internal RAM 75. Data which is output in cipher to external RAM 12 passes from internal RAM 75 via bus 61 to register 62 for enciphering. Circuit 4 is switched to an enciphering mode to produce an enciphered block in register 63. This block is output via buses 69, 61 and 14 to external RAM 12 or to another storage device addressed by bus 13.

To avoid the inefficiencies of deciphering and reenciphering a block merely to store one byte in it, temporary results may be stored in RAM 75 in cache-memory fashion until processing of the block is complete before reenciphering and outputting the block on bus 14.

Portions of the deciphered instructions fetched from queue 65 include operation codes which are decoded by unit 67, immediate data which is passed via buses 68 and 61 to RAM 75 or bus 14, and address portions which are passed via buses 68 and 72 to conventional address register file 73. This file may include base, segment, page, word and/or byte addresses from which conventional addressing unit 74 computes a logical address for outputting on bus 13.

Plain unenciphered data may be read and written in the conventional manner via buses 14 and 61 and buffer 60. Regions of address space may be restricted to be solely read/write or fetch-only so that deciphered instructions on bus 64 cannot be passed via bus 69 to RAM 75 or output on bus 14. This prevents a pirate from tricking the microprocessor into writing out its own deciphered program, because the program cannot read itself as data in this embodiment, not even intentionally.

SCRAMBLED ADDRESS EMBODIMENTS

If each enciphered byte is deciphered as it is read into CMP 16 rather than being deciphered as part of a block, improved speed and simplicity may be achieved. Various byte-deciphering functions may be used. These include simple substitution, transposition, and polyalphabetic substitution. These general cryptographic methods are discussed in standard texts on cryptography. Of the three methods, polyalphabetic substitution is the most secure. The main weakness of classical polyalphabetic methods is their periodicity, i.e. the same "alphabets" are used again and again. In the present invention this periodicity may be eliminated by combining the byte being deciphered with its address, so that a byte is enciphered differently depending on where in memory it is located.

Crypto-microprocessors which use this encryption method are shown in FIGS. 1, 8, 9, and 15. To decipher a byte the enciphered byte is exclusive-ORed with a scrambled function of the byte's address. The security of this encryption method resides in the scrambling function which may be simple (as in FIG. 10) or complex (as in FIG. 11). Although the general scrambling method may be publicly known, the specific key or tables used in the scrambling function are kept secret by the owner of the programs being protected, and are very difficult for an unauthorized person to discover.

A pirate might study execution sequences of an executing program, make inferences about the probable value of each byte, and try various alternatives until he painstakingly reconstructs the original program byte by byte. But the time and effort to reconstruct the program from externally accessible information will generally exceed the value of the program. Hence this invention makes breaking the cipher more trouble than rewriting the program independently, and thereby accomplishes its primary objective, which is to deter piracy.

Referring to FIG. 8, CMP 16 includes conventional program counter 83, instruction decoder 67, arithmetic-logic unit (ALU) 70, data registers 71, address register 77, and internal bus 61. External address bus 13, data bus 14 and internal bus 61 may consist of 8-bits, 16-bits, 20-bits or other sizes. Microprocessor 16 operates in a conventional cyclical sequence: incrementing program counter 83, outputting an address on bus 13 during an address cycle, inputting an instruction byte on bus 14 from random-access memory (RAM) 12 in a fetch cycle, decoding the fetched instruction in circuit 67, reading a data address from RAM 12 into address register 77, addressing a bytee of data in a data address cycle, and reading data from RAM 12 into internal RAM 75 or register 71. Other devices (not shown) such as peripheral interface modules and other microprocessors may be attached to external buses 13 and 14 as part of a microcomputer system.

The deciphering circuit (scrambler 24 and exclusive-OR gates 29) within microprocessor 16 contains several substitution tables (each table is called an "S-box") which are used in the address-scrambling process. Each microprocessor 16 unit contains the same integers in these tables, but each table may contain a different arrangement of integers. It is this quasi-random arrangement of integers which is kept secret and may be different for each microprocessor unit. These rearranged integers may be stored into the tables in scrambler 24 when the programs to be protected are enciphered, or may be generated when needed from a cipher kkey.

When microprocessor 16 fetches or reads enciphered bytes from RAM 12, the address on bus 13 specifies to RAM 12 the location of an enciphered byte which is conveyed on bus 14 to CMP 16. During the address cycle, while the address from register 77 is stabilizing on bus 13, the address is also being scrambled by unit 24 to produce a scrambled address on bus 27. This scrambled address is stable during the following clock cycle when the byte from RAM 12 is on bus 14. The scrambled address on bus 27 is exclusive-ORed by gates 29 with the byte on bus 14 during this read cycle to produce a deciphered byte on bus 80. Propagation delay in gates 29 is much less than a clock cycle. Hence CMP's which use this deciphering method do not require additional clock cycles for deciphering. Execution of an enciphered program by a CMP can therefore proceed at the same speed as a conventional microprocessor.

Figure 10:
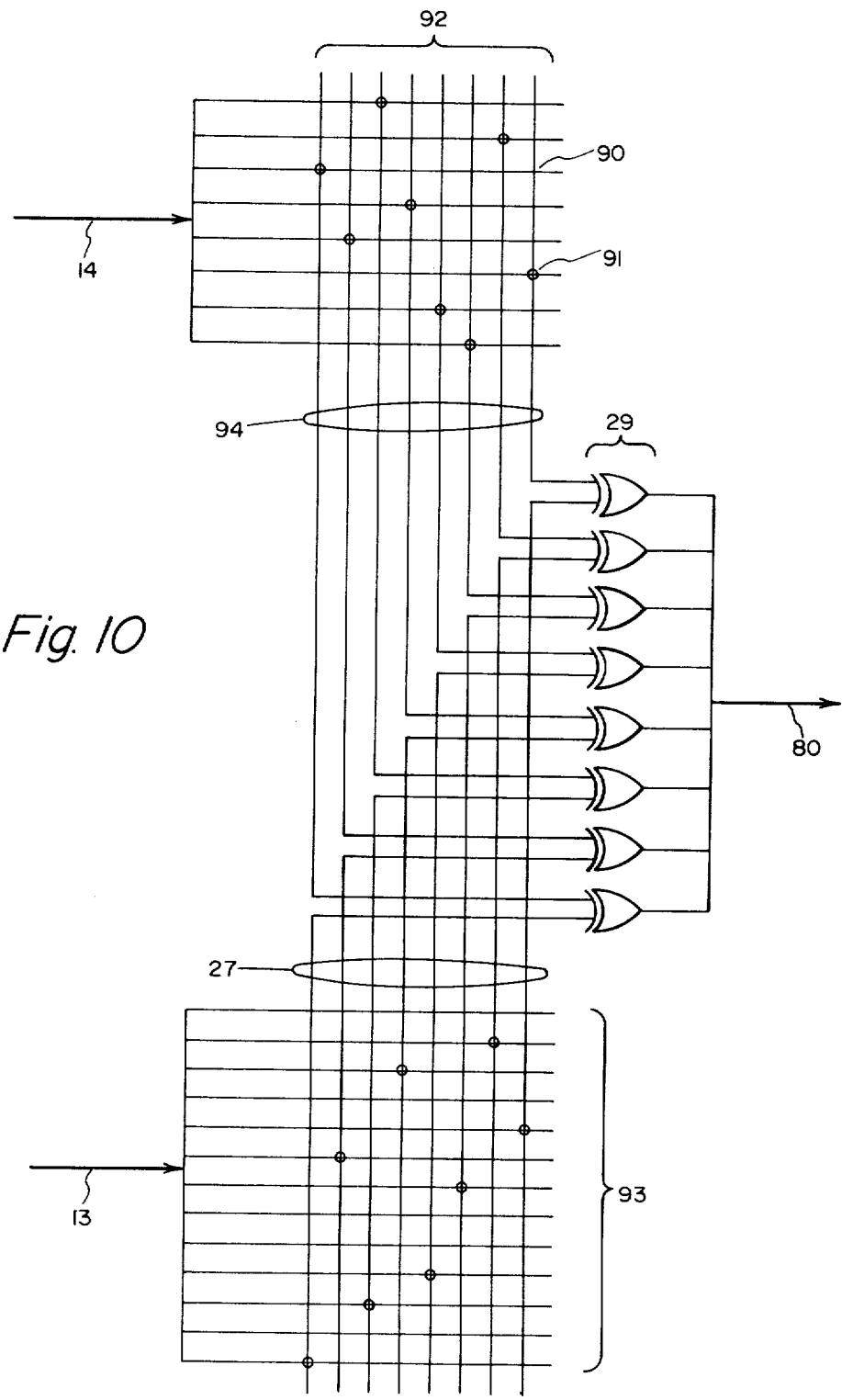
FIG. 10 is a schematic diagram of an exemplary diciphering circuit suitable for use in boxes 29, 92 and 93 of FIG. 9.
Figure 11:
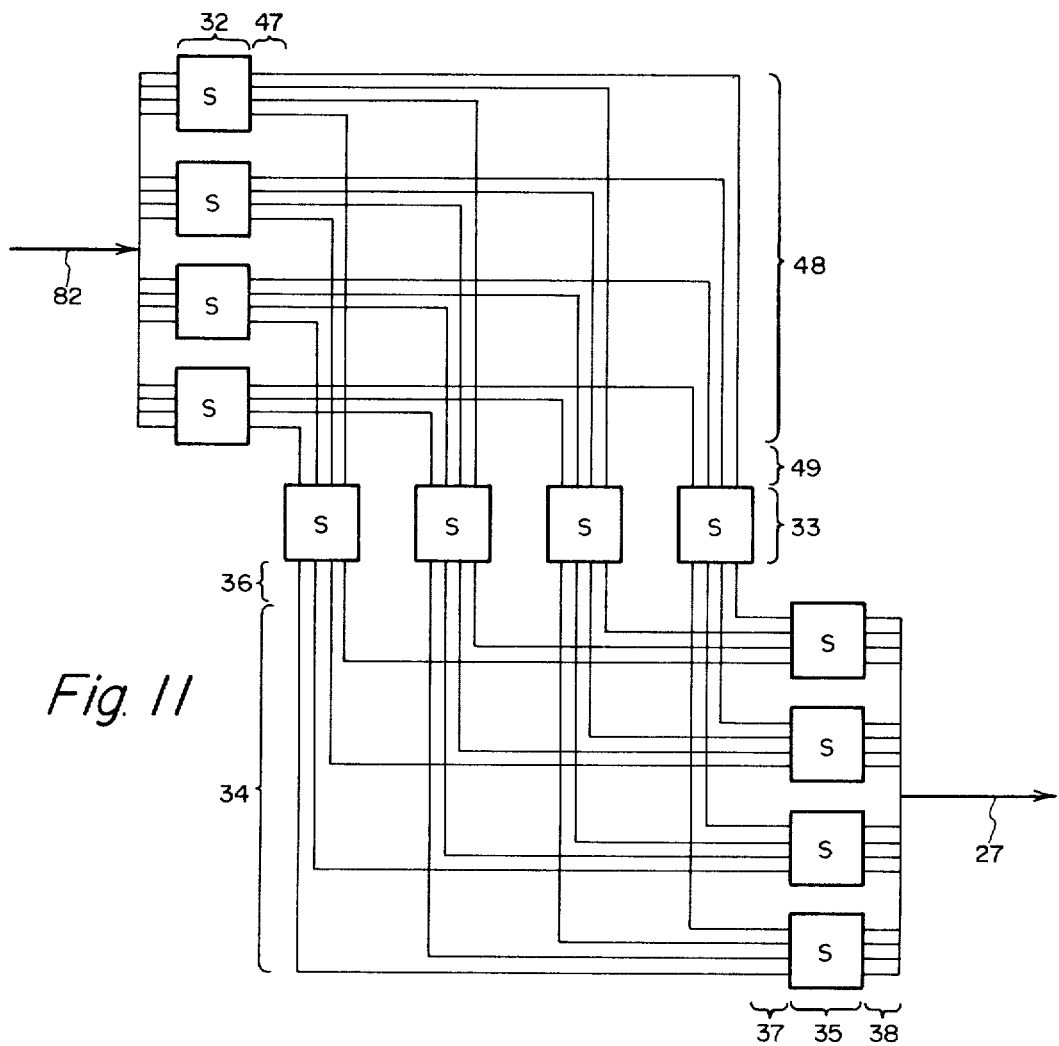
FIG. 11 is a schematic diagram of exemplary details of address scrambler 24 of FIG. 8.

The details of scrambling unit 24 are shown in FIGS. 11-13 and 23. The scrambler shown in FIG. 11 uses a 16-bit address. The scrambler shown in FIG. 13 uses a 36-bit address (as might be used with a single-level addressed videodisc as shown in FIG. 21). The scrambler shown in FIG. 23 uses a 20-bit address and 8-bit bytes. Other address sizes may be used. Each substitution table (S-box) 32 and 35 in FIG. 11 provides a table-lookup of a 4-bit integer in a table of 16 permuted integers. These integers are "0000" through "1111" (binary) in each table, but each table contains a different quasi-random permutation of these integers. There is an inexhaustible number of such permutations. Sandwiched between S-boxes 32 and 33 is transposition stage 48 which consists of a rows-and-column bit transposition in which one bit output from each S-box 32 is input to each S-box 33. Similarly transposition stage 34 is sandwiched between S-box stages 33 and 35. The transpositions may be accomplished by simple crossed wires or a matrix of MOS devices (such as 90 or 93 in FIG. 10). Each S-box 33 provides a fixed nonaffine substitution function such as those described in U.S. Pat. No. 3,958,081 in Tables 10-13. S-boxes 32 and 35 may also be nonaffine. Such functions produce outputs which have no linear relationship to the inputs. Alternatively, S-boxes 32 and 35 may be fixed and publicly known while S-boxes 33 may contain randomly permuted integers.

The S-boxes may be non-invertible and may contain randomly located integers which are also stored elsewhere in the same S-box. Multiple sets of integers may be stored in the same S-box as used in the scrambler shown in FIGS. 13 and 23. The bit transposition stages 48 and 34 need not be as regular as the rows and columns cipher shown in FIGS. 11, 13 and 23, but may include irregular connections. If each bit on bus 27 is not affected by every address bit, this weakness may be disguised if most of the bits in the address affect every bit on bus 27.

The S-boxes 32 (FIG. 11) cause each address bit to affect 4 bits on lines 47. The crossed-wire transposition matrix 48 spreads these four bits to the four S-boxes 33. Thus each bit of address on bus 82 affects all four S-boxes 33 which affect all 16 bits in transposition matrix 34 and all 16 lines 37 going into S-boxes 35. All lines on bus 27 are thus affected by each bit on bus 82. Moreover, knowledge of corresponding byte values for buses 82 and 27 does not reveal the bit values in the S-box integers.

S-boxes 35 and transposition matrix 34 may be omitted in simple embodiments without significant reduction in security. Referring to FIG. 12B, S-boxes 32 and 35 may contain a random, alterable permutation of integers. Such as simplified scrambler using the three stages STS is resistant to known plaintext attack if the amount of plaintext available to the pirate is small (such as error messages which are included in many programs). For many applications the scrambler shown schematically in FIG. 12B is sufficiently secure, especially if no plaintext is output by CMP 16. Error messages and the like which are output in clear form may be stored in memory 12 in an address space reserved for unenciphered cleartext. If cleartext does not participate in the deciphering process it is of no use to the pirate in breaking the cipher.

When the address of a byte is scrambled using this function, and the resulting scrambled address is exclusive-ORed to the byte located at that that address, the value of the byte is as secure as the address-scrambling function if each address is used for only one byte. If the same location is used at different times for more than one byte value, known plaintext at that location reveals the scrambled address at that location and hence all subsequent plaintext bytes at that location. But this still does not reveal the key or S-box integers in FIG. 11.

The bits in the S-boxes 32 and 35 may be stored in the CMP chip in electrically alterable devices so that each CMP unit may be loaded with different bit values if desired. A circuit for loading the S-boxes is detailed in FIG. 14 and is described below.

Each program should be enciphered using a different integer permutation in S-boxes 32 and 35 so even if plaintext for an entire program (65,536 bytes in this example) were known and even if a hidden weakness in the choice of permutations yielded the contents of S-boxes 32 and 35, this would reveal nothing about a second program which uses different S-box permutations. Each copy of the same program may use the same or different permutation of integers.

Figure 12A:
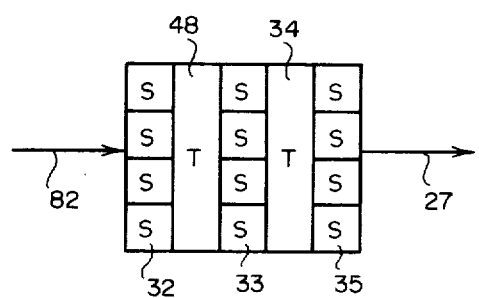
FIG. 12A is a generalized schematic diagram of a 5-stage product block cipher for use as scrambler 24 or unit 4.
Figure 12B:
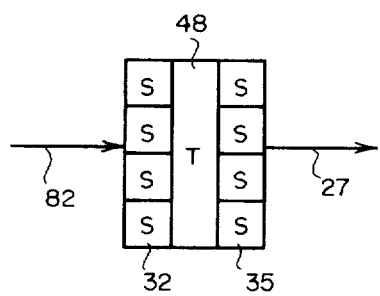
FIG. 12B is a generalized schematic diagram of a 3-stage product block cipher for use as scrambler 24 or unit 4.
Figure 13:
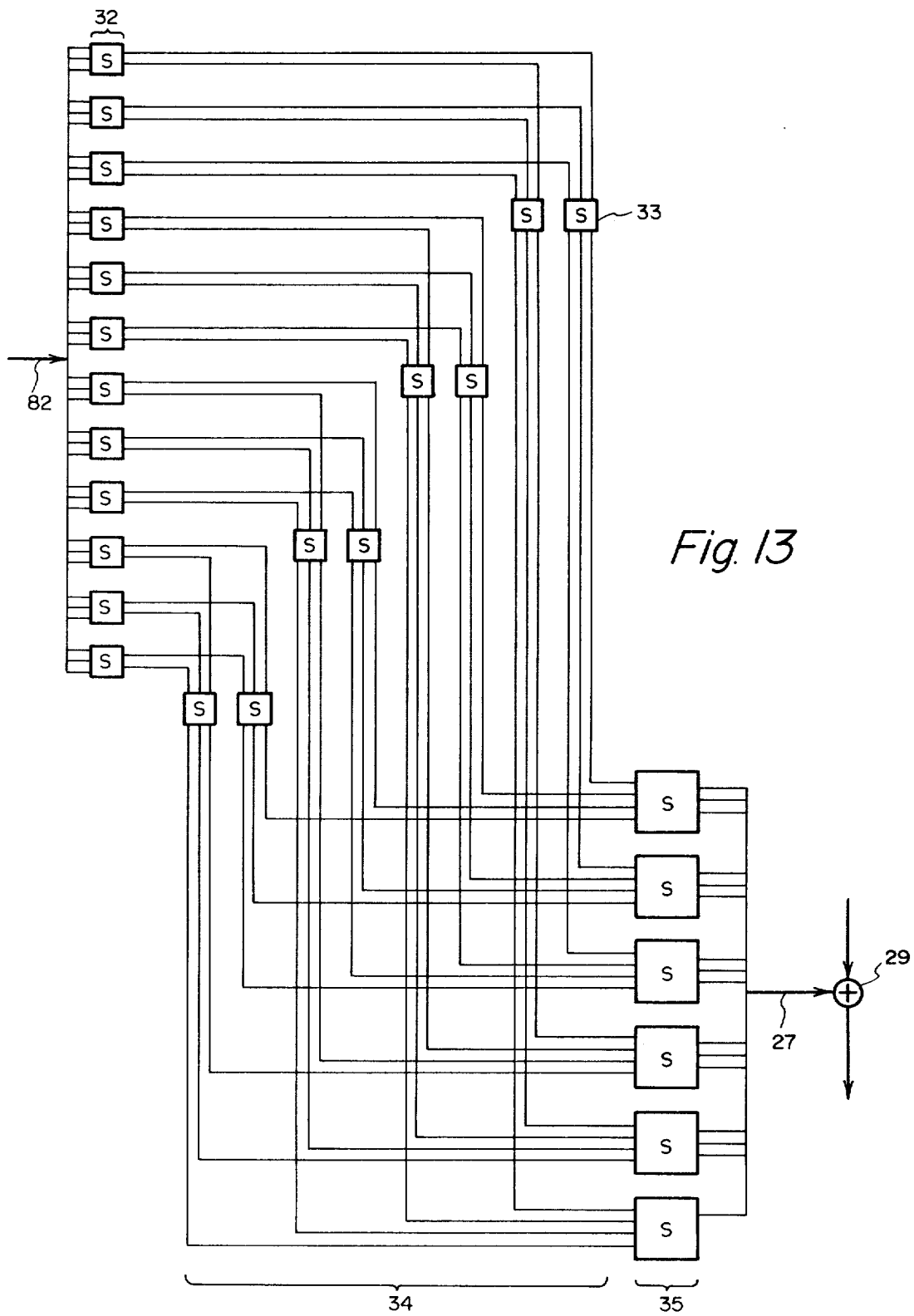
FIG. 13 is a schematic diagram of an address scrambler for a 36-bit address and 16-bit data bus.

The address-scrambling method shown in FIGS. 11-13 may be used for scrambling addresses other than 16-bit addresses. For example, addresses of 25 bits may be scrambled by using five 5-bit S-boxes 32 and five 5-bit S-boxes 35. In general, each of the bits from an S-box in one stage may be transposed to a different S-box in the next stage to insure that a change in any one input bit affects all output bits.

An address scrambler using alternating substitution and bit transposition may scramble an address containing more bits than the program byte or word. Referring to FIG. 13, an address of 36 bits may be scrambled down to a 16-bit scrambled address for use with a 16-bit word processor. Each S-box 32 receives 3 bits of address from bus 82 but provides only 2 bits to S-boxes 33. Similarly each S-box 35 provides 3 bits for each 4-bits it receives. The STSTS method used in FIG. 13 is not a block cipher because the output is not unique for each input, but this provides no help to a pirate. Each bit of scrambled address is affected by every bit of address according to a function which is unknown to the pirate.

Figure 23:
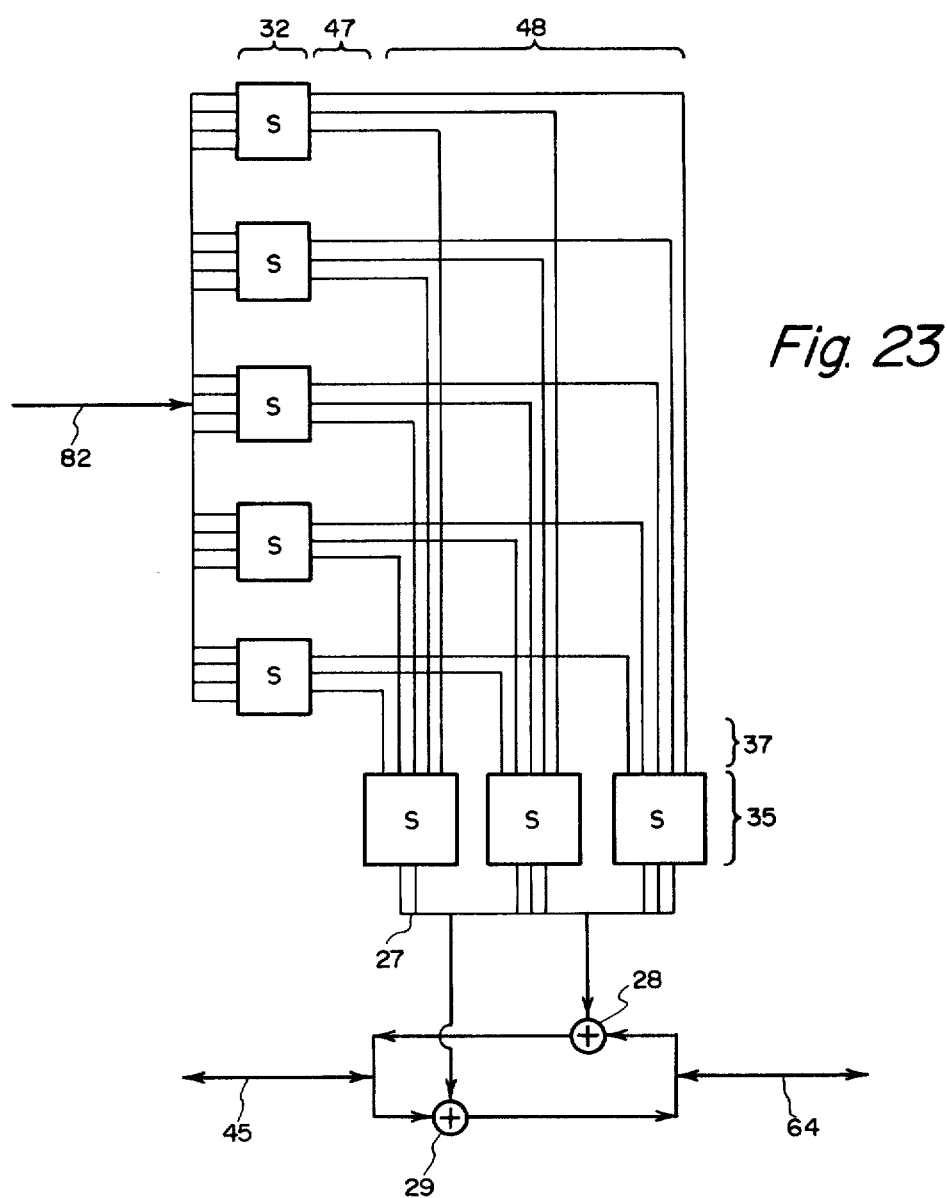
FIG. 23 is a schematic diagram of an address scrambler for an 8-bit data bus and a 20-bit address.

Referring to FIG. 23, an STS scrambler 24 is shown for a 20-bit address on bus 82 which scrambles down to an 8-bit scrambled address on bus 27 for deciphering and enciphering 8-bit bytes on buses 45 and 64. The S-boxes 32 and 35 each contain more than one set of integers which may be permuted in any quasi-random order. In this example, S-boxes 32 each contain two sets of the eight 3-bit integers "000-111", i.e. 16 integers in each S-box 32. The two sets of integers may be intermingled by the permuting program executed in loader 184 (FIG. 3). Similarly, S-boxes 35 in this example each contain four sets of the eight 3-bit integers "000-111", i.e. 32 integers. Each integer value is stored four times at random locations in each table of 32 integers.

In general, the method of deciphering shown in FIG. 23 may be used to decipher an enciphered byte of x bits (on bus 45) which is obtained from a memory location (in RAM 12 FIG. 1) addressed by a digital address (on but 82) of w bits which are scrambled down to x bits (on bus 27) for combining (using exclusive-OR gates 29) with the x-bit byte (on bus 45) to form a byte of deciphered information (on bus 64) of x bits. The scrambling down process consists of substituting (by S-boxes 32) n bits (on lines 47) for the w-bit address (on bus 82), transposing the n bits (by matrix 48), and substituting (by S-boxes 35) x bits of scrambled address (on bus 27) for the n transposed bits (on bus 37). The integers w, x, n and m are all greater than one, w is greater than x, and n is at least as great as x or greater than x.

HOMOPHONIC POLYALPHABETIC SUBSTITUTION

Ordinarily a given byte at a given address has only one cipher using the scrambled address method. However, in some systems a region of address space may be reserved for an external RAM which uses only a fraction of the reserved space. In other words, some of the bits in the address may be unused for that region. These bits may be given random values which participate in the address scrambling process, but are not output on bus 13. A given byte may therefore have several homophones at a given RAM address. This improves the security of the scrambled address method when storing different data values in cipher at the same location.

DESCRIPTION OF FIG. 1

Figure 1:
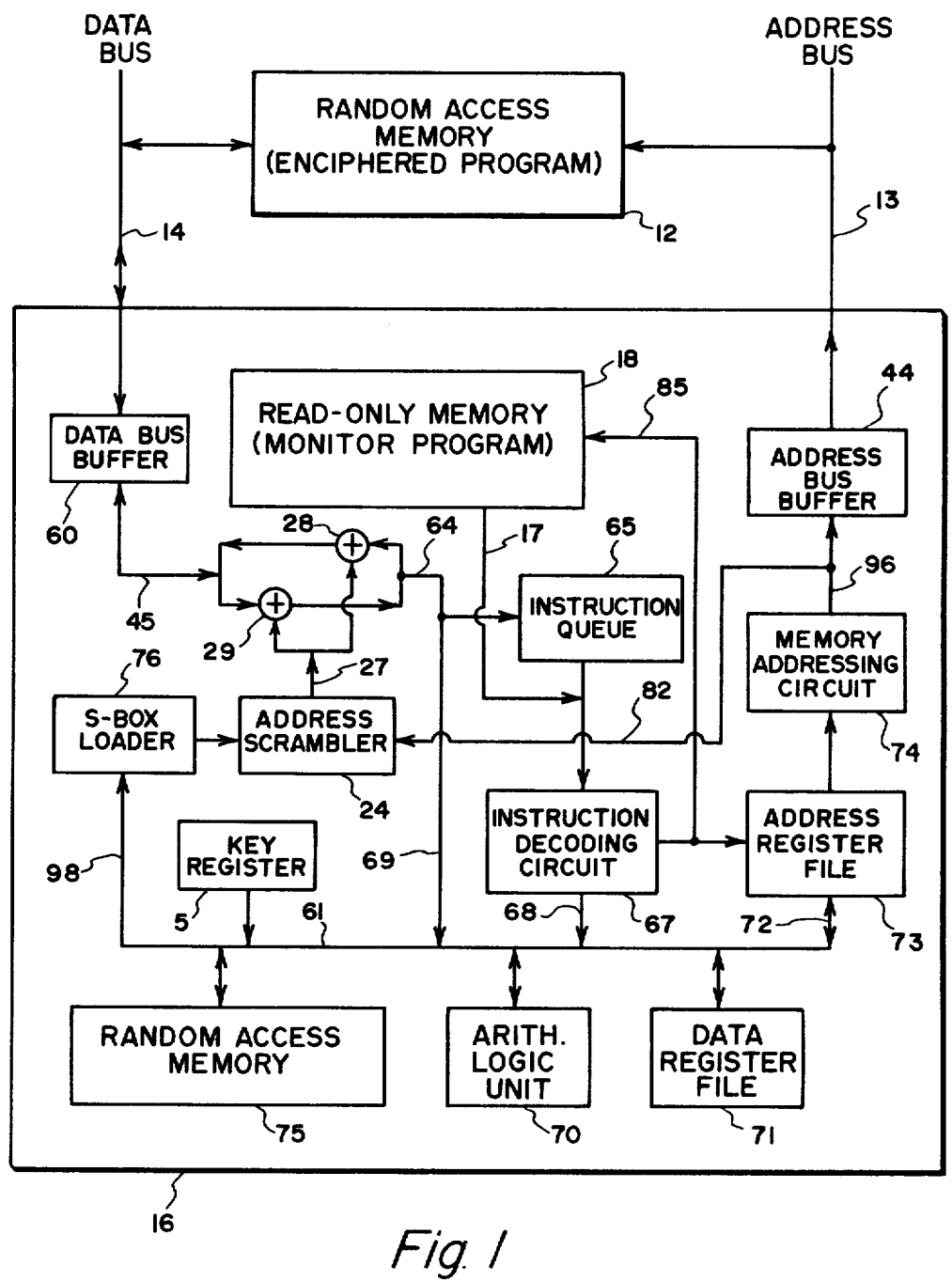
FIG. 1 is a block diagram of a crypto-microprocessor (CMP) which uses the scrambled-address method of encryption.

Referring to FIG. 1, an embodiment is shown which is similar to FIG. 8, but includes additional features. Instruction bytes may be fetched from memory 12 and deciphered ahead of execution. The deciphered bytes are stored in multi-byte instruction queue 65 so that execution and fetching of instructions may be overlapped. Data bytes may be enciphered as they are written to memory 12.

Deciphering of program bytes and enciphering/deciphering of data bytes is done by exclusive-ORing the byte to be enciphered or deciphered with a scrambled function of its bus 82 address. This exclusive-ORing is done by gates 28 for enciphering of output being written to memory 12, and by gates 29 for deciphering of input being read from memory 12. The scrambled address on bus 27 is generated by scrambler 24 by performing a scrambling transformation on the address on bus 82 as described above. Unenciphered information (cleartext) may be read in and written out via buses 14, 45, and 69 by forcing zeros onto bus 27 for regions of address space which are permitted cleartext. Fetching of unenciphered instructions from the cleartext space should be inhibited to prevent unauthorized patching.

Summarizing the sequence of events during the fetching of a typical instruction, and referring to FIG. 1, an instruction address is computed by conventional circuit 74 from various address values in register file 73. The computed logical address on bus 96 is output on bus 13 and is also conveyed internally via bus 82 to scrambler 24 which generates a scrambled address on bus 27. An enciphered byte is read onto data bus 14 from the location in memory 12 specified on address bus 13.

The enciphered instruction byte is input to CMP 16 in the fetch cycle via bus 14. The scrambled address on bus 27 is exclusive-ORed in gates 29 with the enciphered instruction byte from bus 14 to produce a deciphered instruction byte on bus 64 which is stored in instruction queue 65. If memory addressing by unit 74 overlaps reading of bytes on bus 14, then a one-cycle latch (not shown) should be inserted in bus 27 to synchronize the scrambled address with its corresponding fetched byte. Instruction decoder 67 obtains its instructions from queue 65 or ROM 18 as described above for FIG. 2.

If the instruction being executed stores a byte into external storage in cipher, its address on bus 96 is scrambled as described above and the scrambled address on bus 27 is exclusive-ORed in gates 28 with the plain data byte on buses 61 and 69, to produce a cipher byte which is output by buffer 60 to external data bus 14 which conveys the cipher byte to external memory 12.

Later when this data byte is read from memory 12 the cipher byte on buses 14 and 45 is exclusive-ORed with the same scrambled address on bus 27 yielding the original plaintext data byte on buses 64, 69 and 61.

The address on bus 96 may be further scrambled before being output onto bus 13 by a substitution table, transposition matrix, or other encryption circuit included with buffer 44. Similarly a cipher byte from gates 28 may be further enciphered before being output onto bus 14.

PROGRAM AND KEY LOADER

Referring to FIG. 3, if memory 12 (described above) is an electrically alterable or programmable read only memory (PROM), each CMP unit may use a different cipher key which is randomly generated at the time memory 12 is programmed (loaded). Enciphering unit 184 performs the key generation and loading functions and is used in a secure location by the proprietor of the program to be enciphered.

Plugged into unit 184 is circuit board 183 on which are mounted memory 12 and CMP 16. Also plugged into unit 184 is memory module 160 containing a cleartext copy of the program to be enciphered. For security reasons memory 160 may be unplugged from enciphering unit 184 when not in use. Alternatively, the program in memory 160 may be stored in cipher and deciphered by unit 184 to protect the program from theft while it is stored in memory 160.

Operation of unit 184 to store the key into CMP 16 may be done by a different operator at a different time than storing the enciphered program into memory 12, so that an operator with access to the key on line 163 does not have access to the enciphered program on line 165 and vice versa.

One embodiment of enciphering unit 184 is shown in FIG. 3. Initially counter 185 is reset to zero. Random number generator 188 generates a random key which is stored into key register 167. Circuit 162 copies the key in register 167 onto bus 163 from which the key is stored into CMP chip 16. The key is also made available to address scrambler 186. The term "key" is used here in a broad sense to include both conventional cipher key and permuted integers in S-box tables.

Address counter 185 is incremented to produce an address on buses 181 and 164. Address bus 181 addresses a byte of cleartext program in memory 160 which is output onto bus 180. The address on bus 181 is scrambled by scrambler 186 which may be constructed as shown in FIG. 13 or otherwise in accordance with the address scrambler used in deciphering circuit 4. Scrambler 186 produces a scrambled address on bus 187 which is exclusive-ORed with the program byte on bus 180 by gates 182 to produce a cipher byte on bus 165. This cipher byte is stored into memory 12 at the address specified on address bus 164. Address counter 185 is then incremented to the next address. This cycle continues until all program bytes in memory 160 have been enciphered and stored into memory 12.

Figure 22:
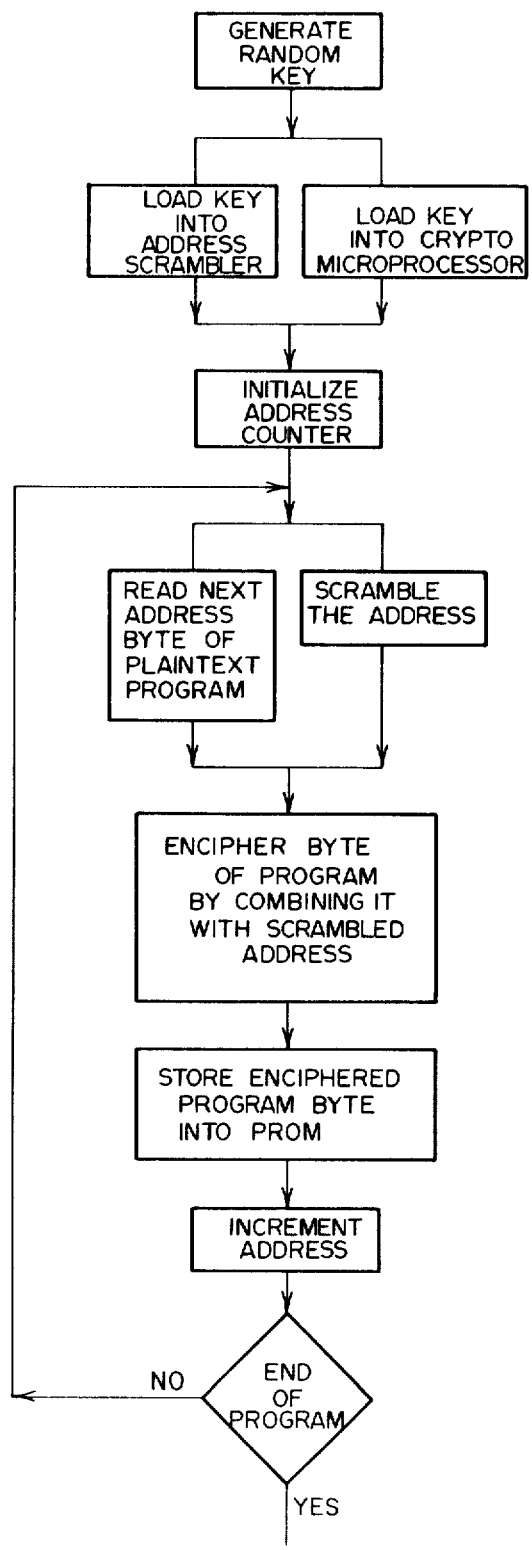
FIG. 22 is a process flowchart for one possible sequence which a programmed microprocessor may follow to load key and enciphered program information into a CMP module as in FIG. 3.

Referring to the process flowchart in FIG. 22, the functions of enciphering unit 184 may be performed by a second microprocessor (not shown) executing a second program which may also be stored in cipher to prevent tampering. This second program may proceed as follows:

(1) Generate a random number for use as a key.

(2) Output this key onto line 163 to load into CMP 16.

(3) Load this key into address scrambler 186 (which may consist of temporarily stored substitution tables similar to the S-box tables used in CMP 16.

(4) Initialize address counter 185 to the first address in memory 160 of the program to be enciphered.

(5) Scrambler the address in counter 185 using address scrambler 186 to produce a scrambled address.

(6) Read from memory 160 the byte addressed by address counter 185.

(7) Combine this byte with the scrambled address by exclusive-OR addition to produce an enciphered byte.

(8) Store this enciphered byte into memory 12 via bus 165 at the address specified by address counter 186 via bus 164.

(9) Increment address counter 186 be adding one.

(10) If this incremented address does not exceed the end of the program in memory 160, loop back to step 5 above, otherwise the enciphering process is done.

Steps 2 and 3 above and steps 5 and 6 above may be performed in parallel or consecutively. Other processes may be used which are equivalent to the steps shown in FIG. 22.

For CMP embodiments which require randomly permuted integers in the S-boxes such as shown in FIG. 23, the permuting process may proceed as follows (for each S-box 35 except the S-box which has only two bits of output): Four sets of integers are stored into register 167 in the periodic numeric sequence "000 ... 111000 . . . 111000 ... 111". Random number generator 188 generates two random 5-bit numbers N1 and N2. If N1=N2 then another two numbers are generated. N1 and N2 represent locations in register 167 which, in this example, are addressable by 5-bit addresses and contain 3-bits each. The 3-bit integer specified by address N1 is exchanged with the integer at address N2. This process then repeats with another pair of randomly addressed integers, then again for several hundred iterations. Once the integers have been thoroughly mixed, they are loaded one by one into CMP 16 by loader 162 which generates the control bits described below with reference to FIG. 14. The S-box integers are also stored into address scrambler 186 which is a duplicate of scrambler 24. A similar process may be used by a routine in ROM 18 in CMP 16 (FIG. 1) to generate from the key in register 5 the S-box integers for loader 76 to load into scrambler 24.

S-BOX LOADING CIRCUIT

Figure 14:
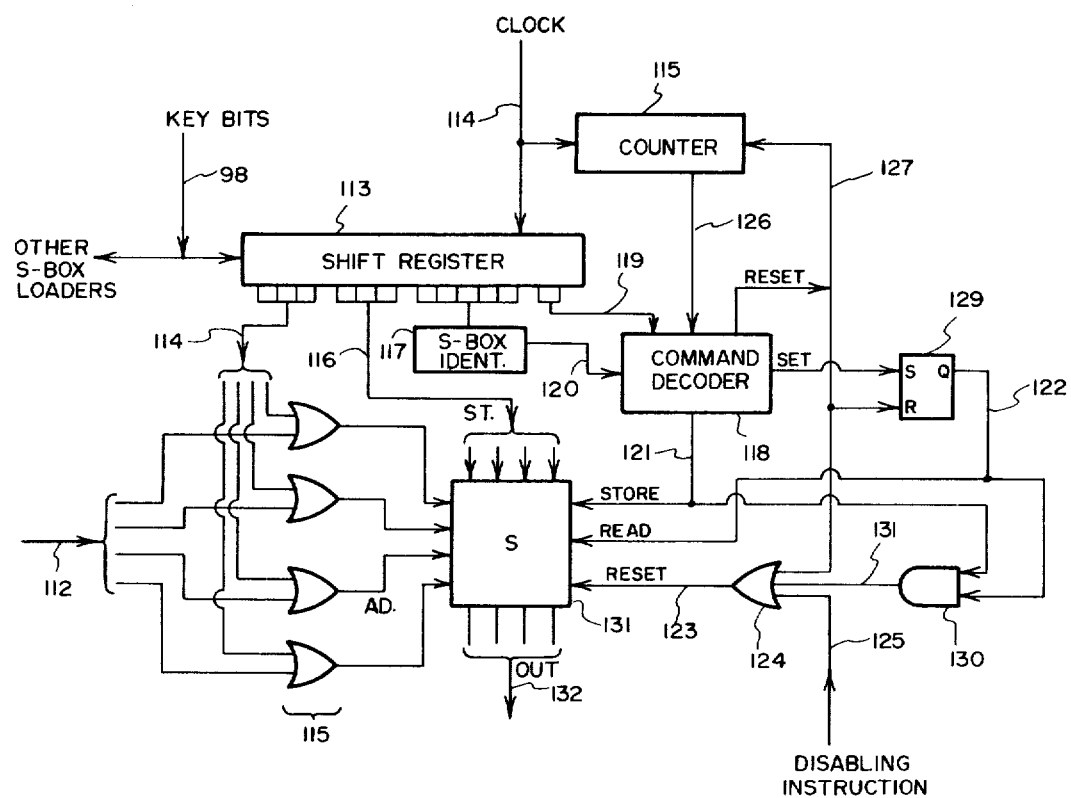
FIG. 14 is a schematic diagram of exemplary details of a circuit which may be used to load S-boxes in a CMP, such as loader 76 in FIG. 1.

Referring to FIG. 14, a circuit is shown which may be used for loading permuted integers into a substitution table (S-box 131). Each loading circuit may service one S-box or be shared by multiple S-boxes (such as 32 or 35 in FIG. 11). These loading circuits are collectively represented as box 76 in FIG. 1. The integers to be loaded are input to shift register 113 as a continuous stream of key bits on line 98. These bits may be internally generated by an integer-permuting program stored in ROM 18 (see FIG. 1) according to the key in register 5, or may be input as a bit stream from loader 162 (FIG. 3) via an external pin or other conductor.

In the example in FIG. 14 the bit stream shifted into register 113 consists of a 2-bit command code 119, a 6-bit number 117 which identifies which S-box 131 is to be loaded, the 4-bit integer 116 to be loaded, and a 4-bit address 114 which identifies the S-box location where the 4-bit integer 116 is to be stored. The 2-bit command code is "00" for reset, "01" for store, and "10" for setting RS flip flop 129.

A typical loading sequence follows: Code "00" (reset) followed by a 6-bit identifier is shifted into register 113. The 6-bit identifier is recognized by circuit 117 which is hard coded to recognize one 6-bit identifier. Each S-box loader has a different identifier. Circuit 117 issues a true signal on line 120 which enables decoder 118. The reset code "00" on lines 119 is decoded by decoder 118 which issues a true signal on line 127 which resets flip flop 129 and S-box 131. The 4-bit counter 115 is initially reset. Each shift of register 113 is accompanied by incrementing of counter 115. When counter 115 overflows, line 126 goes true which ANDed to line 120 enables decoder 118. The next 16 bit command is shifted or stored into register 113 which provides a "01" (store) code on lines 119, the same 6-bit ident number, an integer on lines 116, and an address on lines 114. Shifting the 16-bit command causes counter 115 to overflow. Lines 120 and 126 are true so decoder 118 is enabled and issues a true signal on line 121 which causes S-box 131 to store the 4-bit integer on lines 116 at the location specified by lines 114. Subsequent 16-bit commands are used to store each of the integers into S-box 131. A subsequent command has a "10" code on lines 119 which causes decoder 118 to set flip flop 129. This enables S-box 131 for reading so that an address on lines 112 will cause a 4-bit integer to emerge on lines 132. Lines 112 in FIG. 14 correspond to each of four sets of lines 37 in FIG. 11. Lines 132 in FIG. 14 correspond to each of four sets of lines 38 in FIG. 11.

Flip flop 129 also enables AND gate 130 which resets (and thereby disables) S-box 131 if any further attempt is made to store into S-box 13. If line 98 is an external conductor, then lines 131 should be ORed together for all S-boxes so that tampering with one S-box resets them all.

The circuit in FIG. 14 may be used with S-boxes which consist of volatile memory and which are reloaded by an internal program when power is turned on. In such an embodiment the key in register 5 (FIG. 1) may be maintained by a permanently connected electric battery 23 (in FIGS. 4 and 6). If the S-boxes are electrically alterable read-only memory then a battery is not needed and loading circuit 76 would be changed accordingly. Another embodiment may use volatile memory for the S-boxes but an electrically-alterable read-only register 5 which requires no maintenance battery 23. Register 5 may be a portion of electrically alterable ROM 18 shown in FIG. 1, so that neither the key nor the monitor program can be read from the chip by photographic enlargement.

EMBODIMENTS WITH ON-CHIP MEMORY

If the enciphered program is small enough it may be stored in ROM in cipher or transposed form on the crypto-microprocessor chip to prevent a pirate from reading the program from a photographic enlargement of the chip or by probing an easily found internal bus. A small cipher key can be hidden among the tens of thousands of devices on the chip, but a large ROM cannot be so hidden. Simple embodiments of CMP's with on-chip programs are illustrated in FIGS. 5-7, 9 and 15-16.

In FIG. 5 bytes of the enciphered program stored in memory 12 in chip 16 are addressed via internal address bus 13, deciphered by circuit 4, and fetched via internal bus 8 by processor 3 for execution. Optionally, the program bytes in memory 12 may be transposed as in FIGS. 6 and 7 so that the address on bus 13 is first scrambled by scrambler 84 before addressing a byte in memory 12. Deciphering circuit 4 may be a simple substitution table or a bit transposition matrix which may be stored in volatile storage devices maintained by battery 23 or in electrically-alterable storage which is not accessible on external buses and not suceptable to probing nor optically readable from the surface of CMP chip 16.

Address scrambler 84 may also be a simple substitution table or a bit transposition matrix whose contents are inaccessible from outside of CMP 16. The effect of scrambler 84 is to scatter the bytes of the program in memory 12 so that a person studying bytes that were read from memory 12 would not know in what sequence they are executed, nor which bytes are operation codes, addresses, or data. If bus 13 is a 16-bit bus, and scrambler 84 is a simple 16-bit transposition matrix (an 8-bit matrix is illustrated in FIG. 10 matrix 93) then there are 16 factorial or $2 \times 10^{13}$ permutations of the address bits on bus 13. This enormous number of permutations is usually of little cryptographic value when used alone because of the case with which the contents of a transposition matrix can be discovered by a person who has access to its inputs and outputs. But in FIGS. 6 and 7 neither the inputs nor outputs of scrambler 84 are externally accessible. Hence a bit-transposition matrix may be used in these on-chip-ROM embodiments without encountering the weaknesses usually associated with bit transposition.

Figure 16:
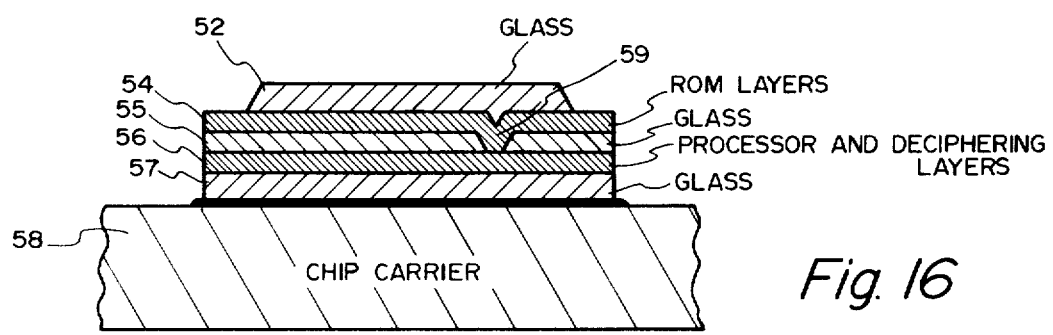
FIG. 16 is a section view of a multiple layer CMP chip.

The bits in circuits 4 and 84 should either be more difficult to discover than the bits in memory 12, or the device should be so constructed that not all bits can be discovered from the same chip. The difference in difficulty may be accomplished in several ways. The bits in circuit 4 may be stored in volatile form. Or they may be stored in physically less accessible portions of the chip. Or, being few in number, they may be located in scattered positions about the chip among unrelated gates, so as to obscure their function to a pirate. CMP 16 may also be constructed as a "three-dimensional" chip as shown in FIG. 16 and discussed below.

Referring to FIG. 9, an embodiment of CMP 16 is shown which uses both on-chip memory 12 and address scrambling. The address on internal bus 13 addresses a byte in memory 12. Meanwhile some of the bits of the address are transposed by matrix 93 to form a scrambled address on bus 27. The bits of the byte read from memory 12 are transposed by matrix 92 before being exclusive-ORed with the scrambled address on bus 27 by gates 29. Matrices 92 and 93 and gates 29 are detailed in FIG. 10. The tiny circles (such as 91 in FIG. 10) in matrix 92 represent positions which are set to conduct signals from a horizontal line in bus 14 to a vertical line in bus 94. Matrix 93 similarly transposes the bits on address bus 13. Bus 13 has more than 8 bits (13–16 bits would be typical) but only 8 of the address bits (chosen at random) are used on lines 27 in FIG. 10. Buses such as 13 and 14 are shown expanded into component conductors in FIG. 10 but are shown as single lines in many of the drawings.

MONOALPHABETIC SUBSTITUTION

A simple monoalphabetic substitution function may be used for deciphering circuit 4 in FIG. 5. A simple substitution table does not provide much security, especially for small byte sizes (like 8 bits), because of the ease with which known plaintext may be used to discover unknown bytes. However in simple embodiments this minimal security may be sufficient. Although some parts of the program are easily discovered, the work required to find a unique solution for the remainder of the program can be greater than rewriting the program.

BYTE TRANSPOSITION

Figure 7:
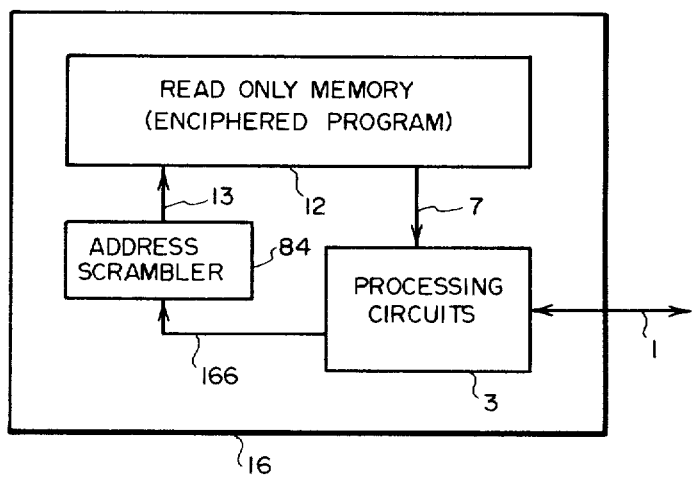
FIG. 7 is a block diagram of a CMP with on-chip ROM using byte transposition.

Referring to FIG. 7, a simple embodiment is shown for a CMP which stores the bytes of the program in a transposed or scrambled arrangement. Since each byte in the program has an address, if this address is scrambled by scrambler 84 using substitution, bit transposition or other means, the effect is to transposed the bytes being addressed in memory 12 by processing circuits 3. When an address is read from memory 12 on bus 7 as part of an instruction, the address is unenciphered and may be stored in a program counter 83 (see FIG. 8) where it may be incremented for sequential instruction fetch. This incremented address is passed via bus 166 to address scrambler 84 so that the byte read from memory 12 is unpredictable to a pirate who does not know the scrambling function 84. To prevent the pirate from discovering this function, buses 7, 13, and 166 should be inaccessible to the pirate during execution. If the pirate can access the bits in memory 12 only after CMP 16 is disfunctional, such access gains him nothing.

PHYSICAL SECURITY

A pirate should not be able to access the circuitry of CMP 16 without erasing the cipher key or otherwise making CMP 16 disfunctional. Although no device can be made that completely prevents physical penetration, the device can be designed to make such penetration futile. The method used for physical protection need not make access to the chip difficult but merely restrict the options of the pirate to methods which destory the key or table information in the chip before it becomes electrically accessible.

Referring to FIG. 15, if CMP 16 is constructed as an integrated circuit chip, then potting in thermoset plastic 50 is an adequate deterrent to all but the most skilled pirate. To prevent removal of the plastic using stripping solvents, a highly crosslinked resin may be used. A drop of such resin may cover the chip alone or CMP 16 may be totally potted. Heavy, preferably opaque, glassification (layer 52) of the chip, such as that described in U.S. Pat. No. 4,133,690, may also provide sufficient protection. A flip-chip arrangement (as shown in FIG. 18) in which the integrated circuitry faces substrate 103, may be used to prevent probing.

If still more security is desired, some of the S-boxes may consist of volatile random-access memory which is maintained by an external electric battery 23. Likewise, key register 5 may be a volatile register maintained by battery 23 through bonding wire 20. Any attempt to access the internal buses or circuitry will most likely sever bonding wire 20 carrying the maintenance current, thereby destroying the S-box or register 5 values. To minimize risk of power failure during routine handling, CMP chip 16 and battery 23 may be attached to a common chip carrier which protects power line 20 from damage.

If non-volatile electrically-alterable devices are used for key register 5 or S-boxes 32, removal of glass layer 52 by abrasives or etching should also destroy the electric charges representing bits in the key.

Various degrees of securing are possible within the scope of this invention. The more secure the device is constructed, the more difficult and expensive is the task of the pirate. The degree of security used can be increased to whatever amount is warranted by the value of the enciphered programs and data. The programs are protected first by encryption, second by physical barriers at the chip level, and finally when those fail, by destruction of the key or substitution tables without which the enciphered program cannot be deciphered.

THREE DIMENSIONAL CHIPS

Referring to FIG. 16, a crypto-microprocessor may be constructed with on-chip memory 12 devices deposited in layer 54 on top of insulating layer 55. Processing circuit 3, internal bus 8, and deciphering circuits 4 and/or 84 are deposited on layer 56 on the under surface of insulating layer 55. Layers 54 and 56 which consist of conventional devices of metal, oxide and semiconductor (MOS) adhere to insulating layer 55 which consists of glass, sapphire, or other suitable insulating material. Conductors which feed through glass layer 55 to connect circuitry in layer 56 with memory 12 in layer 54 are shown schematically as feed through 59. Both layers 54 and 56 are heavily glassified by layers 52 and 57. Layer 57 is epoxied or otherwise attached to chip carrier 58 which prevents access to layer 56 from below.

If the bits of memory 12 and circuit 4 are stored in electrically alterable form, each chip may use a different cipher. So a pirate would be faced with very difficult task of discovering all of the bits in memory 12 before removing layers 54 and 55 to access the bits in circuit 4 in layer 56 of the same chip. Discovering the memory 12 bits in one chip and the circuit 4 bits in another chip, even one of identical design, would gain him nothing.

HYBRID CIRCUITS

Referring to FIGS. 17 and 18, hybrid circuit 104 is shown comprising prior-art microprocessor chip 100 connected to chip 101 via conductors 80 imbedded in substrate 103 on which both semiconductor chips are mounted.

Chip 100 provides the processing functions of fetching, executing, addressing, reading, and writing described above for circuit 3. Chip 101 includes deciphering circuit 4 which in this embodiment includes address register 77, address scrambler 24 and exclusive-OR gates 28 and 29 whose functions are described above for integrated circuit (CMP 16) embodiments.

Hybrid device 104 in FIG. 17 may perform as a whole like a conventional microprocessor exept for the fact that the program it executes, which is stored in RAM 12, is in cipher. Address bus 82 addresses program bytes in RAM 12 via external address bus 13. The address on bus 82 is also stored into register 77 and is scrambled by circuit 24 (described above). Each enciphered byte addressed in RAM 12 is input to device 104 on bus 14 and is exclusive-ORed with the scrambled address on bus 27 by gates 29 to produce a deciphered byte on internal bus 80. The data bus pads on chip 100 are connected to internal bus 80. To make bus 80 as inaccessible as possible, its conductors should be imbedded in substrate 103 which may be ceramic or other material which resists cutting, grinding, etc. To deter access to the bonding pads by probing from above, the embodiment illustrated in FIG. 18 uses a flip-chip arrangement with the integrated circuitry facing the substrate and with solder bumps which are partly hidden to make it difficult for a pirate to probe them. Device 104 may be potted in a highly cross-linked resin for further security.

To prevent a pirate from rearranging chips 100 or 101 so that bus 80 is accessible, photo sensor 99 may be connected to chip 101 or integrated therein so that removal of cover 102 exposes photo sensor 99 to visible light which erases one or more key bits in address scrambler 24, thereby irreversibly disabling device 104.

MULTI-PROCESSOR EMBODIMENTS

Figure 19:
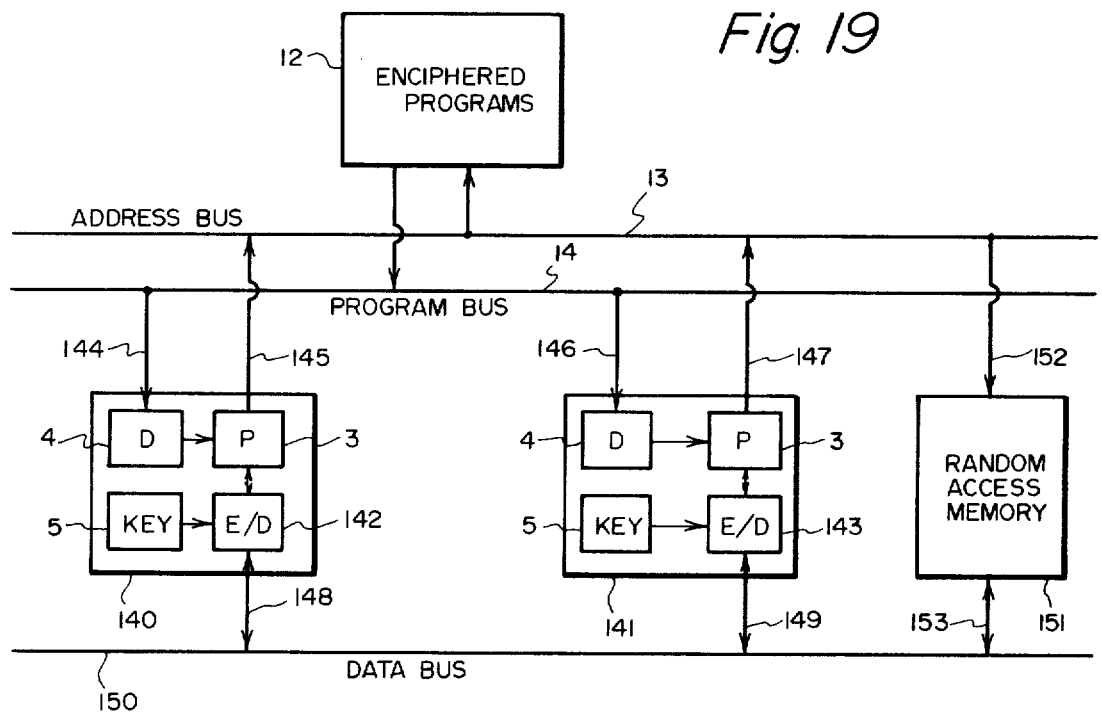
FIG. 19 is a block diagram of part of a multi-processor using two CMP chips.

Referring to FIG. 19, a portion of a computer is shown which uses two crypton-microprocessors 140 and 141 each of which may be constructed as described herein. In this embodiment each CMP includes two deciphering circuits 4 and 142. Circuit 4 deciphers program instructions for execution by processing circuit 3. Circuit 142 deciphers and enciphers data which is communicated in cipher between CMP 140 and 141 on data bus 150. Cleartext (unenciphered) data may also be communicated on bus 150. Each CMP addresses program bytes from memory 12 via address bus 145 or 147. Addressed program bytes are fetched by CMP 140 or 141 via program bus 14. Each CMP may have its own program storage device 12 or the programs may be stored in a common memory 12 as shown in FIG. 19. Each CMP may address data in RAM 151 via address bus 13 for reading from data bus 150 or for storing into RAM 151 from bus 150. The data in RAM 151 may be in cipher or in clear form.

Enciphering circuits 142 and 143 may function as described in Ehrsam et al, U.S. Pat. No. 3,958,081. Other encryption methods may be used in circuits 142, 143, and 4 including those described herein.

The key in register 5 in each CMP may be changed by the respective CMP depending on whether bus 150 communication is between CMP's or between a CMP and RAM 151. Still other keys may be used in the conventional manner for data transmission and/or storage.

The key or tables in program deciphering circuit 4 may be different in each CMP. If the respective keys are entirely independent, then a pirate who succeeds in obtaining the key or plaintext program or breaking the cipher for CMP 140 is still prevented from plagerizing the system because the program executed by CMP 141 is still unavailable to him. Large systems which require more security than a single CMP can provide, may be protected by enciphering it in separate segments, each in a different cipher, and separately executing each segment in its own CMP.

CRYPTO INTERPRETERS

Prior-microprocessors may execute a program in machine-code, or in a source-code, or in an intermediate form called pseudo-code. When a processor executes a source-code or pseudo-code program, the processor may actually be executing still another machine-code program called an interpreter or simulator which executes the source-code or pseudo-code interpretively.

Figure 20:
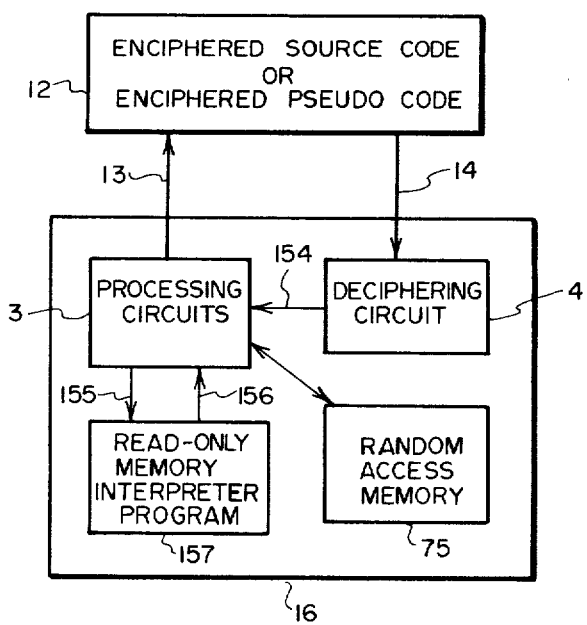
FIG. 20 is a block diagram of a CMP interpreter.

Referring to FIG. 20, the program in memory 12 may be in source-code or pseudo-code, but in either case is in cipher. A portion of the enciphered program is read from memory 12 via bus 14 for deciphering by circuit 4. The deciphered portion of source or pseudo-code on bus 154 is interpreted by processing circuit 3 executing a conventional interpreter program stored in internal ROM 157. To execute the program in ROM 157, processing circuit 3 addresses instruction bytes via bus 155 and fetches via bus 156. As the executing interpreter program scans and interprets each portion of deciphered code from bus 154, scan tables and other temporary results may be saved in internal RAM 75. Subsequent portions of enciphered program are addressed by processing circuit 3 via address bus 13 for reading from memory 12 into CMP 16 via bus 14.

OPTICAL DISC EMBODIMENT

Referring to FIG. 21, an embodiment of the invention is shown which executes on enciphered program stored on conventional disc 170 which is optionally readable by conventional reader units 171-173. Such a disc is commonly called a videodisc even through video data may or may not accompany the enciphered program on the disc. Magnetic discs may also be used.

Conventional reader 173 positions a beam of laser light on a disc track specified by the track address in register 175. A disc 170 rotates, the pulse-codemodulated (PCM) pits or spots in the selected track are sequentially read through lens 171 which focuses the track onto photo sensor 172. The information read from the track may be the entire track or a sector thereof. A sector address in register 175 specifies which portion of the track is to be read and conveyed to conventional memory management unit 176.

Memory management unit 176 is a "virtual storage" or address translation device such as that described in U.S. Pat. No. 4,037,215 which decides the physical location in memory 178 or 12 to store information. When a logical block address is presented by CMP 16 via bus 13 to register 175, memory management unit 176 converts the logical address to a physical address in an appropriate page in random access memory 12 or magnetic bubble memory 178 and writes the addressed block onto bus 14. If unit 176 cannot find the addressed page in memory 178 or 12, disc reader 173 is selected to read the addressed information from disc 170. Pages of such enciphered information may be stored at any convenient location in memory, but from the standpoint of CMP 16 each block addressed by register 175 appears on bus 14. Hence units 170, 173, 176, 178, and 12 provide a virtual memory with a continuous and unambiguous address space.

Byte address register 77 in CMP 16 includes both the bits of a logical block address and also low-order bits to address a byte within the addressed block. The bits in register 77 are used by scrambler 24 to produce a scrambled address.

The enciphered block addressed by register 175 is read from bus 14 into register 30 in CMP 16, is exclusive-ORed with the scrambled address on bus 27 by gates 29, and the deciphered block is stored in register 31. The low-order bits 87 of the address in register 77 specify a byte in block 31 or 30 which is fetched by processor 3.

Address-scrambler 24 in FIG. 21 may be constructed as shown in FIG. 13. The number of address bits in register 77 may be several times larger than the number of bits in a byte or word to be deciphered at gates 29. FIG. 13 shows a scrambler which accepts an address of 36 bits and produces a scrambled address on bus 27 of 16 bits. It will be noted that every address bit on bus 82 affects every bit on bus 27. Conversely every bit on bus 27 is affected by every bit on bus 82. The S-boxes in FIG. 13 are constructed as described above for FIG. 11.

The word "byte" has been used herein in a broad sense to mean a portion of information or word of 8 bits or other small word sizes such as 6 bits or 9 bits.

Although I have described the preferred embodiments of my invention with a degree of particularity, the present disclosure is made only by way of example. Equivalent embodiments which do not depart from the scope and spirit of my invention may occur to those skilled in the art in the light of this disclosure.

I claim the following:

1. A cryptographic microprocessor apparatus constructed as an integrated circuit chip for executing a computer program of information stored in enciphered form in a storage means as a plurality of portions of enciphered program instructions, the apparatus comprising:
   means included in said chip for storing a cipher key;
   deciphering means included in said chip for cryptographically transforming a portion of said enciphered program information under control of said cipher key to produce a portion of deciphered information containing a deciphered instruction in said program;
   processing means included in said chip for fetching a deciphered instruction from a portion of deciphered information from said deciphering means, and for executing the deciphered instruction, and for addressing in said storage means a subsequent portion of said enciphered program information for transforming by said deciphering means.

2. A cryptographic microprocessor apparatus constructed as an integrated circuit chip for executing a computer program of instructions stored in enciphered form in a storage means as a plurality of portions of enciphered program information, the apparatus comprising:
   register means included in said chip for storing a cipher key;
   deciphering means included in said chip for cryptographically transforming a portion of said enciphered program information under control of said cipher key to produce a portion of deciphered information containing a deciphered instruction in said program;
   processing means included in said chip for fetching a deciphered instruction from a portion of deciphered information from said deciphering means, and for executing the deciphered instruction, and for addressing in said storage means a subsequent portion of said enciphered program information for transforming by said deciphering means; and
   internal bus means included in said chip for conveying a portion of said deciphered information from said deciphering means to said processing means, the internal bus means being isolated from external access during the conveying of said deciphered information so as to prevent external access to portions of said program in deciphered form.

3. A cryptographic microprocessor apparatus constructed as an integrated circuit chip for executing a computer program of instructions stored in enciphered form in a storage means as a plurality of portions of enciphered program information, the apparatus comprising:
   register means included in said chip for storing a cipher key;
   deciphering means included in said chip for cryptographically transforming a portion of said enciphered program information under control of said cipher key to produce a portion of deciphered information containing a deciphered instruction in said program;
   processing means included in said chip for fetching a deciphered instruction from a portion of deciphered information from said deciphering means, and for executing the deciphered instruction, and for addressing in said storage means a subsequent portion of said enc.phered program information for transforming by said deciphering means, the processing means being operative to produce output information;
   external means for conveying said output information to a location externally of the apparatus; and
   internal bus means included in said chip for conveying a portion of said deciphered information from said deciphering means to said processing means, the internal bus means being electrically isolated from said external bus means during the conveying of said deciphered information so as to prevent external access through said external bus means to portions of said program in deciphered form.

4. A cryptographic microprocessor apparatus for executing a computer program of instructions stored in enciphered form as a plurality of portions of enciphered program information, the apparatus comprising:

register means for storing a cipher key;

deciphering means for cryptographically transforming a portion of said enciphered program information under control of said cipher key to produce a portion of deciphered information containing a deciphered instruction in said program;

processing means for fetching a deciphered instruction from a portion of deciphered information from said deciphering means, and for executing the deciphered instruction, and for addressing in said storage means a subsequent portion of said enciphered program information for transforming by said deciphering means; and means for erasing the cipher key in said register means after a pre-established amount of time of operation of the apparatus has elapsed, thereby enforcing a time limit on use of said enciphered program.

5. A cryptographic microprocessor apparatus for executing a computer program of instructions stored in enciphered form as a plurality of portions of enciphered program information, the apparatus comprising:

register means for storing a cipher key;

deciphering means for cryptographically transforming a portion of said enciphered program information under control of said cipher key to produce a portion of deciphered information containing a deciphered instruction in said program;

processing means for fetching a deciphered instruction from a portion of deciphered information from said deciphering means, and for executing the deciphered instruction, and for addressing in said storage means a subsequent portion of said enciphered program information for transforming by said deciphering means; and means for accumulating the number of times the apparatus is enabled and for erasing the cipher key in said register means after the accumulated number of times has reached a preselected number, thereby enforcing a limit on an amount of use of said enciphered program.

6. A method of protecting a computer program of executable instructions during storage and during execution in a microprocessor having buffer means therein of a size substantially smaller than the program being protected, comprising the steps of:

storing said program externally of the microprocessor in enciphered form as a plurality of decipherable blocks;

addressing a block of said enciphered program;

deciphering said addressed block in said microprocessor to produce a corresponding deciphered block of executable instructions in said microprocessor buffer;

fetching an instruction in said microprocessor from said deciphered block;

executing said fetched instruction in said microprocessor; and addressing a subsequent block of said enciphered program for deciphering in said microprocessor in accordance with said executed instruction.

7. A method of protecting a computer program of executable instructions during storage and during execution in a microprocessor, comprising the steps of:

enciphering said instructions in accordance with a predetermined cipher key;

storing said enciphered instructions in a memory;

reading an enciphered instruction from said memory;

deciphering said enciphered instruction in said microprocessor in accordance with said cipher key;

executing said deciphered instruction in said microprocessor; and addressing a subsequent enciphered instruction in said memory in accordance with said executed instruction.

8. A method of protecting a computer program of executable instructions, comprising the steps of:

storing said program in enciphered form as a plurality of addressable portions;

generating an address for addressing a portion of said program in said plurality of portions;

combining a cipher key with said address to produce a scrambled key;

deciphering said addressed portion under control of said scrambled key to produce a deciphered portion;

executing an instruction in said program which is included in said deciphered portion; and addressing a subsequent portion of said enciphered program in accordance with said executed instruction.

9. A method of protecting a computer program of executable instructions, comprising the steps of:

storing said program in enciphered form as a plurality of addressable portions;

generating an address for addressing a portion of said program;

combining a cipher key with said address to produce a scrambled address;

deciphering said addressed portion under control of said scrambled address to produce a deciphered operation code;

executing an instruction in said program which includes said deciphered operation code; and addressing a subsequent portion of said program in accordance with said executed instruction.

10. A method of protecting a computer program of executable instructions, comprising the steps of:

storing said program as a transposed arrangement of addressable program portions;

addressing a portion of said program;

executing an instruction in said program which includes said addressed portion and a program address;

scrambling said program address in accordance with said transposed arrangement to produce a scrambled address; and addressing a subsequent portion of said program in accordance with said scrambled address.

11. A cryptographic microprocessor apparatus constructed as an integrated circuit chip for executing a program of instructions stored therein in enciphered form, the apparatus comprising:

storage means included in said chip for storing said enciphered program as a plurality of addressable bytes;

deciphering means included in said chip for cryptographically transforming a byte of said enciphered program to produce a byte of deciphered information containing an executable portion of an instruction in said program;

processing means included in said chip for executing said instruction, and for addressing in said storage means a subsequent byte of said enciphered program for transforming by said deciphering means.

12. A cryptographic microprocessor apparatus for executing a scrambled program of instructions, the apparatus comprising:

means for storing said program as a plurality of addressable bytes in a transposed arrangement, each byte having a digital address;

processing means for fetching a byte in said storing means containing a portion of an instruction in said program, and for executing said instruction, and for addressing a successor byte in said program by specifying a digital address; and means for cryptographically transforming said digital address to produce a scrambled address in accordance with said transposed arrangement of bytes in said storing means, thereby addressing a byte in said storing means for fetching by said processing means.

13. The apparatus of claim 12, wherein said storing means stores said bytes in enciphered form, the apparatus further comprising deciphering means for cryptographically transforming said addressed byte to produce a deciphered byte for fetching by said processing means.

14. A cryptographic microprocessor apparatus for executing a computer program of instructions stored in enciphered form in a storage means as a plurality of portions of enciphered program information, the apparatus comprising:

means for specifying a digital address of a portion of said enciphered program information in said plurality thereof;

register means for storing a cipher key;

means for combining said cipher key with said digital address to produce a scrambled key;

deciphering means for cryptographically transforming said addressed portion of said enciphered program information under control of said scrambled key to produce a portion of deciphered information containing a deciphered instruction in said program;

processing means for fetching a deciphered instruction from a portion of said deciphered information, and for executing the deciphered instruction, and for addressing in said storage means a subsequent portion of said enciphered program information for transforming by said deciphering means.

15. An apparatus for loading information into a cryptographic microprocessor device, the apparatus comprising:

means for storing a variable cipher key;

means for generating a digital address;

means for combining said digital address and said cipher key to produce a scrambled key;

means for enciphering a portion of unenciphered information under control of said scrambled key to produce a portion of enciphered information; and means for storing said portion of enciphered information into a storage means location specified by said digital address.

16. An apparatus for loading an enciphered program of executable instructions into a cryptographic microprocessor device having a program deciphering means which operates under control of key information stored therein, the apparatus comprising:

means for storing a variable cipher key;

means for generating a digital address;

means for reading an executable portion of an unenciphered program from a storage means location specified by said digital address;

means for scrambling together said executable program portion and said digital address and said cipher key to produce a portion of enciphered program; and means for storing said portion of enciphered program into said cryptographic microprocessor device at a location specified by said digital address.

17. A cryptographic microprocessor apparatus constructed as a hybrid circuit of at least two semiconductor chips for executing a computer program of instructions stored in enciphered form in a storage means as a plurality of portions of enciphered instructions, each portion being addressable in said storage means by a digital address, the apparatus comprising:

microprocessor chip means for generating a digital address on an address bus means to specify a portion of an executable instruction, for fetching said specified portion of the executable instruction on a data bus means, for executing said fetched instruction, and for addressing on said address bus a portion of a successor instruction in accordance with said fetched instruction;

external address bus means for conveying said digital address to said storage means to address a portion of an enciphered instruction stored therein;

external data bus means for receiving said addressed portion of enciphered instruction from said storage means;

deciphering means connected to receive a portion of an enciphered instruction from said external data bus means, for deciphering said received portion to produce a deciphered operation code in an executable instruction and for conveying the deciphered operation code to the data bus of said microprocessor chip means, thereby providing said microprocessor with a deciphered instruction in said program.

18. A system of cryptographic microprocessors for executing computer programs of instructions stored in enciphered form as a plurality of portions of enciphered information, the system comprising:

storage means for storing said computer program as a plurality of addressable portions;

first and second cryptographic microprocessors, each microprocessor comprising:

a. means for deciphering a portion of said enciphered information under control of a cipher key to produce a portion of deciphered information which contains a executable portion of an instruction in said program, b. processing means for fetching said instruction from said deciphering means, and for executing said instruction, and for processing a portion of data, and for addressing in said storage means an enciphered portion of a successor instruction for deciphering by said deciphering means, c. means for enciphering said portion of data to be conveyed in cipher to another microprocessor in said system, and d. means for deciphering a portion of data conveyed from another microprocessor in said system; and common data bus means connecting said first and second microprocessors for conveying said enciphered portion of data between said microprocessors.

19. A cryptographic microprocessor apparatus for interpretively executing a computer program of code stored in enciphered form as a plurality of addressable portions, the apparatus comprising:
deciphering means for cryptographically transforming a portion of said program code to produce an executable portion of deciphered code;
means for addressably storing the instructions of an interpreter program; and
processing means for fetching an instruction from said storing means, and for executing the fetched instruction, and for addressing a successor instruction in said storing means, and for addressing a portion of said program code in said plurality of addressable portions, and for processing said executable portion of deciphered code in accordance with said interpreter program, thereby interpretively executing said program code in deciphered form.

20. A cryptographic microprocessor apparatus for interpretively executing a computer program of code stored in enciphered form as a plurality of addressable portions, each portion having a digital address, the apparatus comprising:
scrambling means for transforming the digital address of a portion of said program code to produce a scrambled address;
means for deciphering said portion of program code by combining said scrambled address with said portion of program code under control of a cipher key to produce an executable portion of deciphered code;
means for addressably storing the instructions of an interpreter program; and
processing means for fetching an instruction from said storing means, and for executing the fetched instruction, and for addressing a successor instruction in said storing means, and for addressing a portion of said program code in said plurality of addressable portions, and for processing said portion of deciphered code in accordance with said interpreter program, thereby interpretively executing said program code in deciphered form.

21. A cryptographic microprocessor system for executing a computer program of instructions stored in enciphered form, the system comprising:
means for initiating reading of a portion of said enciphered program recorded in a plurality of portions thereof on a record carrier means, each program portion having a logical address;
memory means for storing said portion of enciphered program at a storage means location which is addressable by a physical address;
address translation means for converting a logical address in said program to a physical address in said memory means; and
cryptographic microprocessor means for specifying the logical address of a portion of said enciphered program, and for fetching the specified portion from said memory means with a physical address provided by said translation means in accordance with said specified logical address, and for deciphering an instruction in the fetched portion, and for executing the deciphered instruction, and for specifying a logical address of a successor portion of said enciphered program.

22. The system of claim 21, wherein said record carrier means is a disc-shaped body having an information bearing structure arranged in concentric tracks.

23. The system of claim 21, further comprising means for reading information from said record carrier means under control of said initiating means.

24. A cryptographic microprocessor apparatus for executing a computer program of instructions stored in enciphered form as portions of enciphered information, the apparatus comprising:
deciphering means for cryptographically transforming a portion of said enciphered information to produce deciphered information which contains an executable portion of an instruction in said program;
processing means for fetching from said deciphered information an executable portion of said instruction, and for executing the instruction; and
means for addressing a portion of said enciphered information which contains a successor instruction portion of said program and which said deciphering means transforms into deciphered form.

25. A cryptographic microprocessor apparatus for executing a computer program of instructions stored in enciphered form as a plurality of portions of enciphered instructions, each portion being addressable with a digital address, the apparatus comprising:
scrambling means for transforming the digital address of a portion of said enciphered instructions to produce a scrambled address;
means for deciphering said portion of enciphered instructions by combining said scrambled address with said portion of enciphered instructions to produce a deciphered instruction in said program; and
processing means for fetching said deciphered instruction from said deciphering means, and for executing the fetched instruction, and for addressing a successor portion of said enciphered instructions for deciphering by said deciphering means.

26. A cryptographic microprocessor apparatus for executing a computer program of instructions stored in enciphered form as a plurality of portions of enciphered instructions, each portion being addressable with a digital address, the apparatus comprising:
register means for storing a cipher key;
deciphering means for cryptographically transforming a portion of said enciphered instructions under control of said cipher key to produce a deciphered instruction in said program;
processing means for fetching said deciphered instruction from said deciphering means, and for executing the fetched instruction, and for addressing a successor portion of said enciphered instructions for transforming by said deciphering means.

27. A cryptographic microprocessor for executing a computer program for executable instructions stored in enciphered form as a plurality of addressable blocks of enciphered information, the apparatus comprising:
deciphering means for cryptographically transforming a block of said enciphered information to produce a block of deciphered information;
processing means for fetching an executable instruction from a block of said deciphered information, and for executing the fetched instruction; and means for addressing a block of said enciphered information which said deciphering means transforms into a deciphered block containing a successor instruction in said program.

28. A cryptographic microprocessor apparatus constructed as an integrated circuit chip for executing a computer program of executable instructions stored in enciphered form as a plurality of blocks of enciphered information, the apparatus comprising:
   means included in said chip for storing a cipher key;
   deciphering means included in said chip for cryptographically transforming a block of said enciphered information under control of said cipher key to produce a block of deciphered information containing an executable instruction in said program;
   processing means included in said chip for fetching an executable instruction from a block of said deciphered information, and for executing the fetched instruction; and
   means in said chip for addressing a block of said enciphered information which said deciphering means transforms into a deciphered block containing a successor instruction in said program.

29. A cryptographic microprocessor for executing a computer program of instructions stored in enciphered form as a plurality of addressable blocks of enciphered program information, each addressable block having a digital address, the apparatus comprising:
   means for addressing a block of said enciphered program information;
   means for storing an encryption key;
   product block deciphering means for transforming said addressed block to produce a block of deciphered information under control of said encryption key and under control of the digital address of said addressed block;
   processing means for fetching an instruction from a block of said deciphered information, and for decoding the fetched instruction, and for executing the decoded instruction, and for addressing a subsequent block of said enciphered program information for transforming by said product block ciphering means.

30. A cryptographic microprocessor apparatus for executing a computer program of instructions stored in enciphered form as a plurality of addressable portions of enciphered information, the apparatus comprising:
   register means for storing first and second variable cipher keys;
   deciphering means for cryptographically transforming a portion of said enciphered information under control of said first cipher key to produce a portion of deciphered information which includes an instruction in said program, and for cryptographically transforming a portion of enciphered information under control of said second cipher key to produce a portion of deciphered data;
   processing means for fetching said instruction from said deciphering means, and for executing the fetched instruction so as to process a portion of said deciphered data, and for addressing a portion of said enciphered information which includes a successor instruction in said program in enciphered form.

31. A cryptographic microprocessor apparatus constructed as an integrated circuit chip for executing a program of instructions stored therein and for processing enciphered data stored as a plurality of portions thereof, each portion having a digital address, the apparatus comprising:
   means included in said chip for storing said program as a plurality of executable instructions;
   register means included in said chip for storing a cipher key;
   means included in said chip for specifying the digital address of a portion of enciphered data;
   means included in said chip for deciphering said portion of enciphered data as a function of said digital address and said cipher key to produce a portion of deciphered data; and
   processing means included in said chip for fetching and executing a plurality of executable instructions in said storing means and for processing said portion of deciphered data.

32. A cryptographic microprocessor apparatus for executing a program of instructions and for processing enciphered data stored as a plurality of portions thereof, each portion having a digital address, the apparatus comprising:
   register means for storing a cipher key;
   means for specifying the digital address of a portion of enciphered data;
   means for deciphering said portion of enciphered data under control of said cipher key by scrambling together said key and said portion of enciphered data and said digital address, thereby producing a portion of deciphered data; and
   processing means for fetching and executing a plurality of executable instructions and for processing said portion of deciphered data.

33. A cryptographic microprocessor for executing a computer program of instructions stored in enciphered form as a plurality of addressable blocks of enciphered information, the apparatus comprising:
   means for storing an encryption key;
   product block deciphering means for transforming a block of said enciphered information to produce a block of deciphered information under control of said encryption key;
   processing means for fetching an instruction from a block of said deciphered information, and for executing the fetched instruction; and
   means for addressing a block of said enciphered information which contains a successor instruction in said program and which said ciphering means transforms into deciphered form.

34. A cryptographic microprocessor apparatus for executing a computer program of instructions stored in enciphered form as portions of enciphered information, the apparatus comprising:
   deciphering means for cryptographically transforming a portion of said enciphered information to produce deciphered information which contains an executable portion of an instruction in said program;
   processing means for fetching from said deciphered information an executable portion of said instruction, and for executing the instruction, wherein said executable portion constitutes a disabling operation code;
   means for addressing a portion of said enciphered information which contains a successor instruction portion of said program and which said deciphering means transforms into deciphered form; and means for altering operation of said deciphering means in response to said disabling operation code, thereby disabling the microprocessor.

35. A cryptographic microprocessor apparatus for executing a computer program of instructions stored in enciphered form as portions of enciphered information, the apparatus comprising:
deciphering means for cryptographically transforming a portion of said enciphered information to produce deciphered information which contains an executable portion of an instruction in said program;
processing means for fetching from said deciphered information an executable portion of said instruction, and for executing the instruction;
means for addressing a portion of said enciphered information which contains a successor instruction portion of said program and which said deciphering means transforms into deciphered form;
register means storing information essential to operation of said microprocessor; and
means for erasing said essential information from said register means, thereby disabling the microprocessor.

36. A method of protecting a computer program of executable instructions during storage and during execution in a microprocessor, comprising the steps of:
storing said program in a memory in enciphered form in accordance with a cipher key;
storing said cipher key in said microprocessor;
fetching an enciphered instruction from said memory;
deciphering said enciphered instruction in said microprocessor in accordance with said cipher key;
executing said deciphered instruction in said microprocessor; and
addressing a successor enciphered instruction in said memory in accordance with said executed instruction.

37. A cryptographic microprocessor apparatus constructed as an integrated circuit chip for executing a program of instructions stored therein in enciphered form, the apparatus comprising:
storage means included in said chip for storing said enciphered program as a plurality of portions of enciphered information;
means included in said chip for storing a cipher key;
deciphering means included in said chip for cryptographically transforming a portion of said enciphered information under control of said cipher key to produce an executable portion of a deciphered instruction in said program;
processing means included in said chip for fetching a portion of a deciphered instruction from said deciphering means, and for executing the deciphered instruction; and
means in said chip for addressing a successor portion of enciphered information in said storage means.

38. A method of executing an enciphered program of instructions, comprising the steps of:
storing said program in enciphered form as a plurality of addressable portions;
storing the cipher key used to control enciphering of said program;
generating an address for addressing a portion of said enciphered program;
scrambling together said addressed portion and said cipher key and said address to produce an executable portion of an instruction in said program;
executing said instruction; and
addressing a subsequent portion of said enciphered program in accordance with said executed instruction.

39. A method of deciphering a block of enciphered information stored in a plurality of addressable blocks of information enciphered under control of a cipher key, comprising the steps of:
storing a cipher key corresponding to said plurality of addressable blocks of enciphered information;
addressing a block of said enciphered information with a digital address;
scrambling together said digital address with said cipher key to produce a scrambled key; and
cryptographically transforming said addressed block under control of said scrambled key, thereby producing a deciphered block of information as a function of said cipher key and said digital address.

40. An apparatus for enciphering information comprising:
means for storing a cipher key;
means for generating a digital address;
means for scrambling together said digital address and said cipher key to produce a scrambled key;
means for performing a block cipher transformation on a block of said information under control of said scrambled key to produce a block of enciphered information; and
means for loading said block of enciphered information into a storage means location specified by said digital address.

41. A cryptographic microprocessor apparatus for executing a computer program of instructions stored in enciphered form as portions of enciphered information, the apparatus comprising:
means for storing a cipher key;
means for modifying said cipher key to produce a modified key;
deciphering means for cryptographically transforming a portion of said enciphered information under control of said modified key to produce deciphered information containing an executable portion of an instruction in said program;
processing means for fetching from said deciphered information and executable portion of said instruction. and for executing the instruction; and
means for addressing a portion of said enciphered information which contains a successor instruction portion of said program and which said deciphering means transforms into deciphered form.

42. A cryptographic microprocessor apparatus constructed as an integrated circuit chip for executing a computer program of executable instructions stored in enciphered form as a plurality of addressable blocks of enciphered program information, the apparatus comprising:
means in said chip for specifying the digital address of an addressed block of said enciphered program information;
means in said chip for storing a cipher key;
deciphering means in said chip for transforming said addressed block to produce a block of deciphered information under control of said cipher key and as a function of the digital address of said addressed block;
processing means in said chip for fetching an instruction from a block of said deciphered information, and for decoding the fetched instruction, and for executing the decoded instruction; and means in said chip for addressing a subsequent block of said enciphered program information for transforming by said deciphering means.

43. A cryptographic microprocessor for executing a computer program of executable instructions stored in enciphered form as addressable portions of enciphered program information, the apparatus comprising:

means for specifying the digital address of an addressed portion of said enciphered program information;

means for storing a cipher key;

deciphering means for scrambling together said addressed portion and said key and said address to produce an executable portion on an instruction in said program;

processing means for fetching an instruction from said deciphering means and for executing the instruction; and means for addressing a subsequent portion of said enciphered program information for deciphering by said deciphering means.

44. A cryptographic microprocessor apparatus for executing a program of executable instructions stored in enciphered form as addressable portions of enciphered program information, the apparatus comprising:

means for storing a cipher key;

deciphering means for cryptographically transforming a portion of said enciphered program information under control of said cipher key to produce an executable portion of a deciphered instruction in said program;

processing means for fetching a deciphered instruction from said deciphering means and for executing the instruction; and means for addressing a successor portion of enciphered program information for transforming by said deciphering means.

45. A cryptographic microprocessor apparatus for processing enciphered data and for executing an enciphered program of instructions addressably stored as portions of enciphered information, the apparatus comprising:

means for storing a cipher key;

deciphering means for cryptographically transforming a portion of said enciphered information under control of said cipher key to produce an executable portion of a deciphered instruction in said program;

means for specifying the digital address of a portion of enciphered data;

means for scrambling together said portion of enciphered data and said digital address to produce a portion of deciphered data;

processing means for fetching a deciphered instruction from said deciphering means and for executing the instruction so as to process said portion of deciphered data; and means for addressing a successor portion of enciphered information for transforming by said deciphering means.

46. The apparatus of claim 45, wherein said deciphering means applies alternating stages of substitution and transposition to said cipher key and said portion of enciphered information so as to make each bit in said executable portion of said deciphered instruction a function of every bit in said cipher key and every bit in said portion of enciphered information.

47. The apparatus of claim 45, wherein said scrambling means comprises:

means for scrambling said digital address to produce a scrambled address; and exclusive-OR gate means for combining said scrambled address and said portion of enciphered data to produce said portion of deciphered data.

* * * * *